United States Patent
L'Allier et al.

(10) Patent No.: US 6,606,480 B1
(45) Date of Patent: Aug. 12, 2003

(54) AUTOMATED SYSTEM AND METHOD FOR CREATING AN INDIVIDUALIZED LEARNING PROGRAM

(75) Inventors: James J. L'Allier, Batavia, IL (US); Albert Pezzuti, Linthicum, MD (US); Stephen P. Henrie, Woodridge, IL (US)

(73) Assignee: National Education Training Group, Inc., Chestnut Hill, MA (US)

( * ) Notice: Subject to any disclaimer, the term of this patent is extended or adjusted under 35 U.S.C. 154(b) by 0 days.

(21) Appl. No.: 09/705,153

(22) Filed: Nov. 2, 2000

(51) Int. Cl.$^7$ ................................................. G09B 7/00
(52) U.S. Cl. ........................ 434/362; 434/219; 434/350; 434/322
(58) Field of Search ................................ 434/219, 362, 434/350, 322

(56) References Cited

U.S. PATENT DOCUMENTS

| | | | |
|---|---|---|---|
| 5,267,865 A | 12/1993 | Lee et al. | |
| 5,302,132 A | 4/1994 | Corder | |
| 5,416,694 A * | 5/1995 | Parrish et al. | 705/8 X |
| 5,437,553 A | 8/1995 | Collins et al. | |
| 5,446,891 A | 8/1995 | Kaplan et al. | |
| 5,692,906 A | 12/1997 | Corder | |
| 5,810,605 A * | 9/1998 | Siefert | 434/362 X |
| 5,823,781 A * | 10/1998 | Hitchcock et al. | 434/118 X |
| 5,823,798 A * | 10/1998 | Jay et al. | 434/365 X |
| 5,904,485 A * | 5/1999 | Siefert | 434/322 X |
| 6,039,575 A * | 3/2000 | L'Allier et al. | 434/323 X |
| 6,126,448 A * | 10/2000 | Ho et al. | 434/219 X |
| 6,157,808 A * | 12/2000 | Hollingsworth | 434/350 X |
| 6,164,975 A * | 12/2000 | Weingraden et al. | 434/322 X |
| 6,213,780 B1 * | 4/2001 | Ho et al. | 434/219 X |
| 6,270,351 B1 * | 8/2001 | Roper | 434/118 X |
| 6,275,812 B1 | 8/2001 | Haq et al. | |
| 6,301,462 B1 * | 10/2001 | Freeman et al. | 434/350 X |
| 6,322,366 B1 * | 11/2001 | Bergan et al. | 434/118 X |
| 6,334,779 B1 * | 1/2002 | Siefert | 434/322 X |
| 6,336,813 B1 * | 1/2002 | Siefert | 434/322 X |
| 6,347,943 B1 * | 2/2002 | Fields et al. | 434/118 X |
| 6,427,063 B1 * | 7/2002 | Cook et al. | 434/350 X |
| 2002/0026452 A1 * | 2/2002 | Baumgarten et al. | 707/104.1 |

OTHER PUBLICATIONS

Verl E. Dennis and Dennis Gruner, "Computer Managed Instruction at Arthur Andersen & Company: A Status Report," Educational Technology, Mar. 1992, pp. 7–16.

James J. L'Allier, Kurt W. Miles, and Sally H. Welsh, "The Netg® Mastery Test Strategy," published as a white paper on the Netg internet web site on Apr. 12, 1995, pp. 1–12.

James J. L'Allier, Kurt W. Miles, "The Skill Builder Philosophy: Learning by Design," (Jan. 9, 1996) Discussion Paper Series.

* cited by examiner

*Primary Examiner*—S. Thomas Hughes
*Assistant Examiner*—Chanda L. Harris
(74) *Attorney, Agent, or Firm*—Allen, Dyer, Doppelt, Milbrath & Gilchrist, P.A.

(57) ABSTRACT

An interactive learning system and method are provided that identify a "gap" between the skill(s) possessed by the individual and those required by an organization and then creates a training regimen to fill that gap. The system and method precisely map the training to the defined required skills by identifying a skill desired to be possessed of a user and accessing a first electronic database that comprises a set of skills currently possessed by the user. Next the desired skill is compared with the possessed set of skills. If the possessed set of skills does not comprise the desired skill, the desired skill is mapped with a training regimen resident in a second electronic database. Then the user is automatically presented with the training regimen. A desired skill level may also be also specified and compared with the skill level currently possessed by the user. If the desired skill level has not yet been achieved, again a mapping is performed and a linked training regimen presented to the user.

17 Claims, 16 Drawing Sheets

DATA COMPRISING USER'S SKILLS AND CURRENT AND DESIRED SKILL LEVELS:

| SKILLS POSSESSED BY USER | CURRENT SKILL LEVEL | DESIRED SKILL LEVEL |
|---|---|---|
| SKILL 1 | 2 | 4 |
| KNOWLEDGE 1 | 1 | 5 |
| KNOWLEDGE 3 | 2 | 4 |
| SKILL 2 | 3 | 4 |
| KNOWLEDGE 2 | 4 | 3 |

411 — SKILLS POSSESSED BY USER
412 — CURRENT SKILL LEVEL
413 — DESIRED SKILL LEVEL
41

DATA COMPRISING SKILLS "GAP":

| SKILLS | CURRENT SKILL LEVEL | DESIRED SKILL LEVEL |
|---|---|---|
| SKILL 1 | 2 | 4 |
| SKILL 2 | 3 | 4 |
| KNOWLEDGE 1 | 1 | 5 |
| KNOWLEDGE 3 | 2 | 4 |

421 — SKILLS
422 — CURRENT SKILL LEVEL
423 — DESIRED SKILL LEVEL
42

DATA COMPRISING TRAINING MAP:

| SKILLS | SKILL LEVEL ACHIEVABLE | COURSE AVAILABLE |
|---|---|---|
| SKILL 1 | 1 | COURSE DA |
| SKILL 1 | 3 | COURSE DB |
| SKILL 2 | 4 | COURSE DC |
| KNOWLEDGE 1 | 1 | COURSE AA |
| KNOWLEDGE 1 | 2 | COURSE FA |
| KNOWLEDGE 1 | 3 | COURSE AB |
| KNOWLEDGE 1 | 4 | COURSE FB |
| KNOWLEDGE 1 | 5 | COURSE AC |
| KNOWLEDGE 2 | 1 | COURSE BA |
| KNOWLEDGE 2 | 3 | COURSE BB |
| KNOWLEDGE 2 | 5 | COURSE BC |
| KNOWLEDGE 3 | 1 | COURSE CA |
| KNOWLEDGE 3 | 4 | COURSE CB |

DATA RESULTING FROM MAPPING TO YIELD RECOMMENDED TRAINING REGIMEN:

| REQUIRED SKILL | RECOMMENDED COURSE |
|---|---|
| SKILL 1 | COURSE DB |
| KNOWLEDGE 1 | COURSE FA |
| SKILL 2 | COURSE DC |
| KNOWLEDGE 1 | COURSE AA |
| KNOWLEDGE 1 | COURSE FB |
| KNOWLEDGE 1 | COURSE AB |
| KNOWLEDGE 1 | COURSE AC |
| KNOWLEDGE 3 | COURSE CB |

*FIG. 3B.*

LEARNING OBJECT™ CONTENT:

CONTEXT
CONTENT
PRACTICE
OBJECTIVE
MASTERY TEST ITEM(S) (OPTIONAL)
BLOOM LEVEL
INSTRUCTIONAL STRATEGY
MOTIVATIONAL STRATEGY — 150

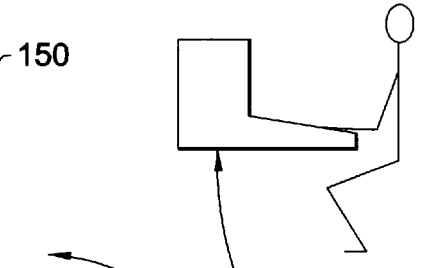

LEARNING OBJECT™ IMPLEMENTATION

| PAGE 1 | . . . | PAGE N |

PAGES ARE LINKED TO EACH OTHER BOTH LINEARLY AND NON-LINEARLY

PAGES CONTAIN:
   TEXT
   MULTIMEDIA COMPONENTS
   USER INTERACTION LOGIC

— 152

OBJECT ACCESS PROGRAM

156

LEARNING OBJECT™ GROUPED TOGETHER

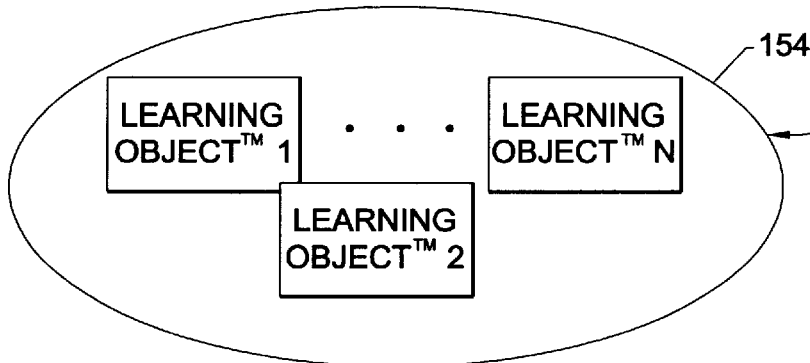

— 154

LEARNING OBJECT™S ARE GROUPED TOGETHER BECAUSE THEY ARE EITHER RELATED OR ONE SERVES AS A PREREQUISITE FOR ANOTHER.

*FIG. 9.*

AUTOMATED SYSTEM AND METHOD FOR CREATING AN INDIVIDUALIZED LEARNING PROGRAM

FIELD OF THE INVENTION

The invention pertains to interactive skill assessment and learning systems and methods. More particularly, the invention pertains to computer-based interactive learning systems that not only identify skill gaps in a user but also map a precise training regimen to fill the identified skill gap.

BACKGROUND OF THE INVENTION

Computer based interactive learning management systems are known. One particular example is described in U.S. Pat. No. 5,395,243 to Lubin et al. entitled Interactive Learning System, which is Assignee to the Assignee hereof. Others include U.S. Pat. No. 4,593,904 to Graves, U.S. Pat. No. 4,867,685 to Brush et al., U.S. Pat. No. 5,180,309 to Egnor, U.S. Pat. No. 5,267,865 to Lee et al., U.S. Pat. No. 5,302,132 to Corder, U.S. Pat. No. 5,306,154 to Ujita et al., U.S. Pat. No. 5,437,553 to Collins et al., U.S. Pat. No. 5,446,891 to Kaplan et al., U.S. Pat. No. 5,489,213 to Makipaa, U.S. Pat. No. 5,597,311 to Yanagida et al., U.S. Pat. No. 5,618,182 to Thomas, U.S. Pat. No. 5,692,906 to Corder, U.S. Pat. No. 5,700,149 to Johnson, III et al., U.S. Pat. No. 5,749,736 to Griswold et al., U.S. Pat. No. 5,802,373 to Yates, et al., Tennyson, "Use of Adaptive Information for Advisement in Learning Concepts and Rules Using Computer-Assisted Instruction," Rothen and Tennyson, "Application of Bayes' Theory in Designing Computer-Based Adaptive Instructional Strategies," Steinberg, "Review of Student Control in Computer-Assisted Instruction," "CMI Guidelines for Interoperability AICC," "The NETg® Mastery Test Strategy," and "The Skill Builder® Philosophy: Learning by Design."

Traditionally, organizations have focused their workforce by creating fairly narrowly defined jobs and improving the skill-sets of the individuals in those jobs by using periodic training. However, as the workplace environment becomes ever more dynamic, job requirements are becoming increasingly more fluid with corresponding employee skill deficiencies that need to be identified in near real-time. Modern-day organizations require their workforce to have varying levels of knowledge and skills in the same subjects. Organizations are posturing themselves to develop accurate profiles of their employees, knowing what knowledge and skills are present within the organization, the competency levels required for each job, where the deficiencies are, and how to provide timely skills upgrading. The traditional manual association (i.e., linkage) of knowledge and skill-set requirements to training interventions is a resource-intensive activity that cannot provide timely responses to ever-changing job requirements. Automated tools and procedures are needed to assist organizations in prescribing the exact training interventions that are needed to satisfy employee skill deficiencies. Thus, in order to fulfill these needs, skills management systems and learning management systems must incorporate an automated system and method that can perform the analysis of employee skill deficiencies and provide a precise training regimen that will bring the employee to the desired competency level. This system and method must also be responsive to organizational skill changes/upgrading and the introduction of new/changed training programs.

SUMMARY OF THE INVENTION

It is an object of the present invention to provide a system and method for creating an interactive learning environment that is specific to a task desired to be learned and to a skill level already possessed by the user.

It is a further object to provide such a system and method that identify a gap between skills possessed by a user and those desired by an organization.

It is another object to provide such a system and method for testing the user before and/or after completing a selected curriculum.

It is also an object to provide such a system and method for developing a customizable learning system.

Another object is to provide a method for maintaining and updating such a customizable learning system.

A further objective is to provide such a method that operates to maintain and upgrade the linkages between skilling objects, which comprise integral skills, and training interventions commensurate with an introduction of new skilling objects or training interventions or changes to existing ones.

In accordance with the invention, an interactive learning system and method are provided that identify a "gap" between the skill(s) possessed by the individual and those required by an organization and then creates a training regimen to fill that gap. The system and method precisely map the training to the defined required skills. In one aspect of the invention, an individualized learning sequence can be developed and presented to the user for the purpose of improving a user's skill and understanding with respect to selected subject matter. While known prior art systems use manual linking of recommended training elements with a desired skill to be learned, the present automatic invention reduces, by at least 95%, the time required to create a link.

The system and method in accordance with the present invention incorporate a computer-based, automatic determination of an individualized learning sequence for a user. The method comprises the steps of identifying a skill desired to be possessed of a user and accessing a first electronic database that comprises a set of skills currently possessed by the user. Next the desired skill is compared with the possessed set of skills. If the possessed set of skills does not comprise the desired skill, the desired skill is mapped with a training regimen resident in a second electronic database. Then the user is automatically presented with the training regimen.

In a preferred embodiment of the method, a desired skill level is also specified and compared with the skill level currently possessed by the user. If the desired skill level has not yet been achieved, again a mapping is performed and a linked training regimen presented to the user.

In an alternate embodiment, if a set of skills and skill levels for the user is not available for accessing, the user instead may be preassessed, with the resultant skill level compared against that. desired.

Another aspect of the present invention is a system and method for developing a customizable learning system. The method comprises the steps of constructing a first electronic table comprising a plurality of skills and a second electronic table comprising a list of training regimen identifiers. Then each skill is mapped to at least one training regimen identifier.

A first database is constructed that is adapted to contain a list of users and a set of skills possessed by each user, and a second database is constructed that is adapted to contain a training regimen associated with each training regimen identifier. A user interface is created that is adapted to receive a selection of a skill desired to be learned from a user, wherein the skill is an element of the first table.

A means is created for accessing from the second database a training regimen that corresponds to the skill/training regimen identifier mapping and for presenting the user with the accessed training regimen.

In a preferred embodiment, the second database comprises a prestored, machine-readable database having a plurality of questions or exercises directed towards assessing the individual's understanding of a selected learning objective. A plurality of questions are provided for each member of a plurality of different skills.

The system carries out an automatic evaluation of the individual, if desired, by sequentially selecting from the database at least one of the questions or exercises associated with each member of the plurality of skills. The selected question or exercise is displayed for the individual, who in turn enters a response. Each of the responses that is received is evaluated relative to a predetermined standard before the next question is selected.

The system accumulates the responses and the results of the evaluations for subsequent processing.

The system in turn produces from the results of the evaluations a training regimen comprising a sequence of instructional units based on those responses that varied materially from the respective standard that are intended to improve the user's skills on an individualized basis. The sequence of instructional units can then be presented on a display, for example. The individual can then progress through the sequence of units so as to improve selected skills in response to the prior evaluation.

In one aspect of the invention, subsequent to complete execution of the training regimen, the user can then go through a postlearning evaluation or test for comparison purposes. If the results of the post-testing indicate that the user has not yet attained the desired skill level, the user is recycled through the system, with a second training regimen automatically produced based upon the postlearning evaluation.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWINGS

FIGS. 3A and 3B illustrate in tabular fashion the data flow for creating a customized individual learning plan.

FIG. 9 is a more detailed flow diagram of another aspect of the process of FIG. 7.

DETAILED DESCRIPTION OF THE PREFERRED EMBODIMENTS

Figure 1A:
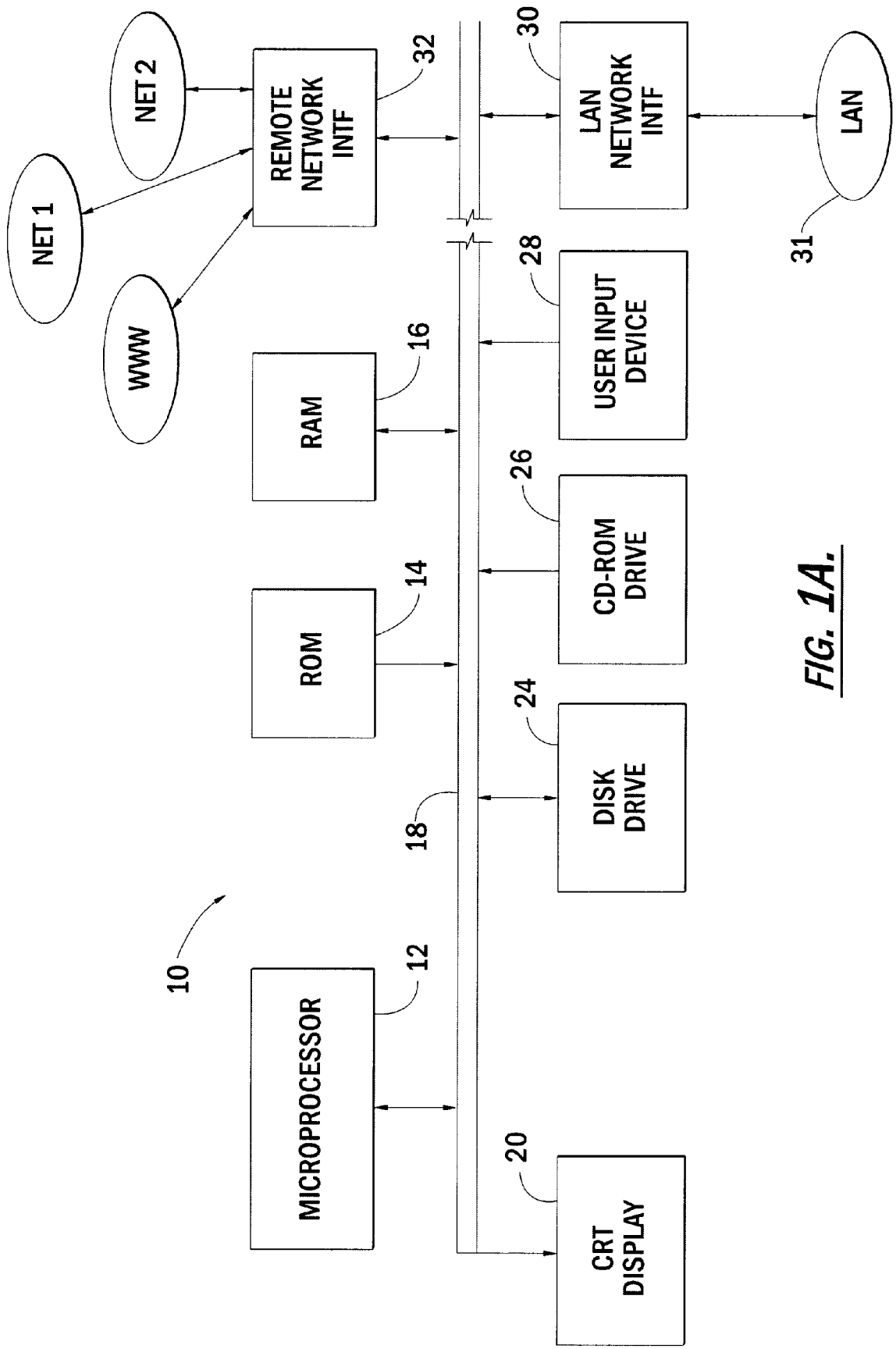
FIG. 1A is a schematic diagram of an exemplary architecture for the system of the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1B:
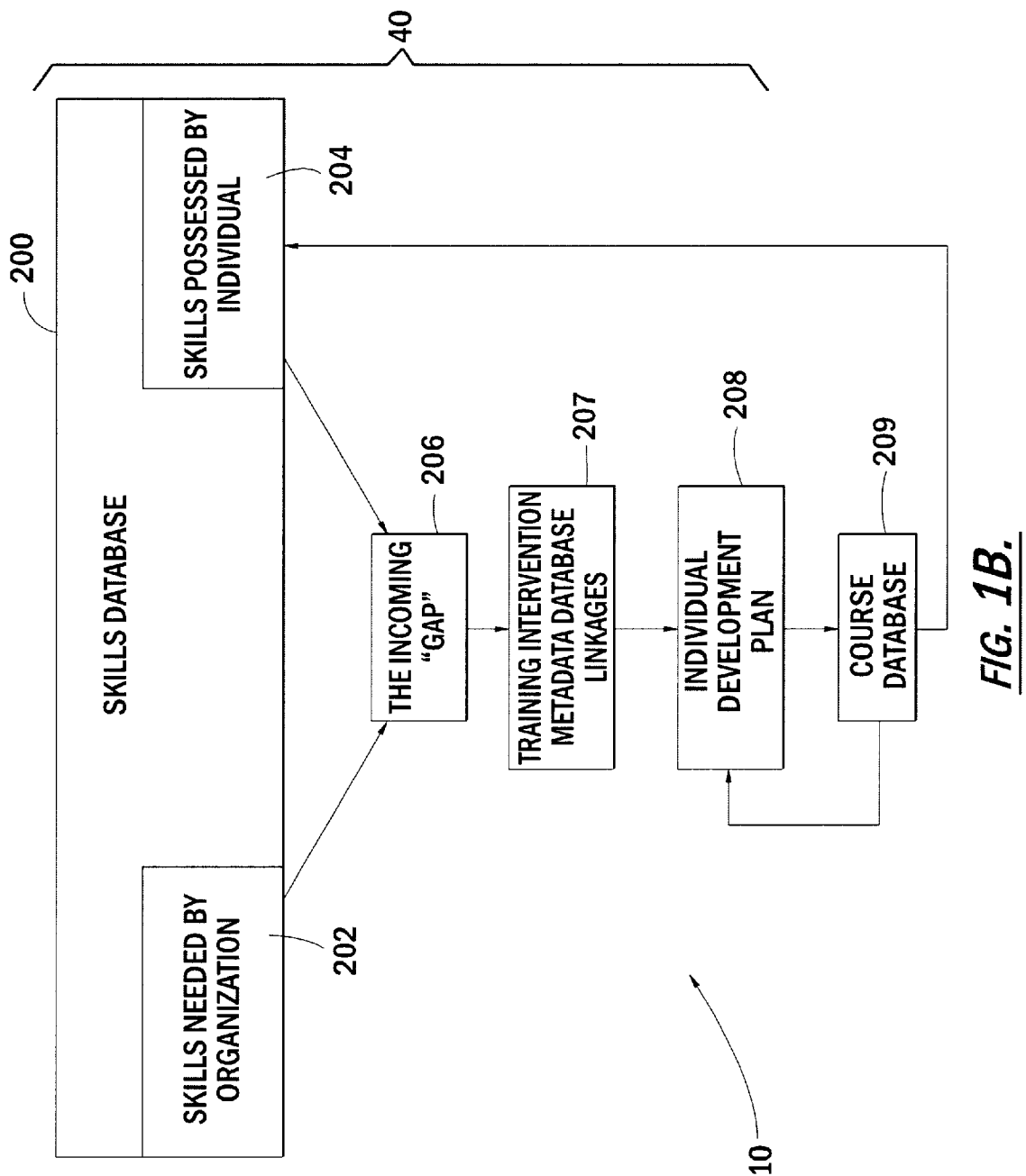
FIG. 1B is a schematic diagram of a typical flow for a user through the functional components of the system of FIG. 1A.
Figure 1C:
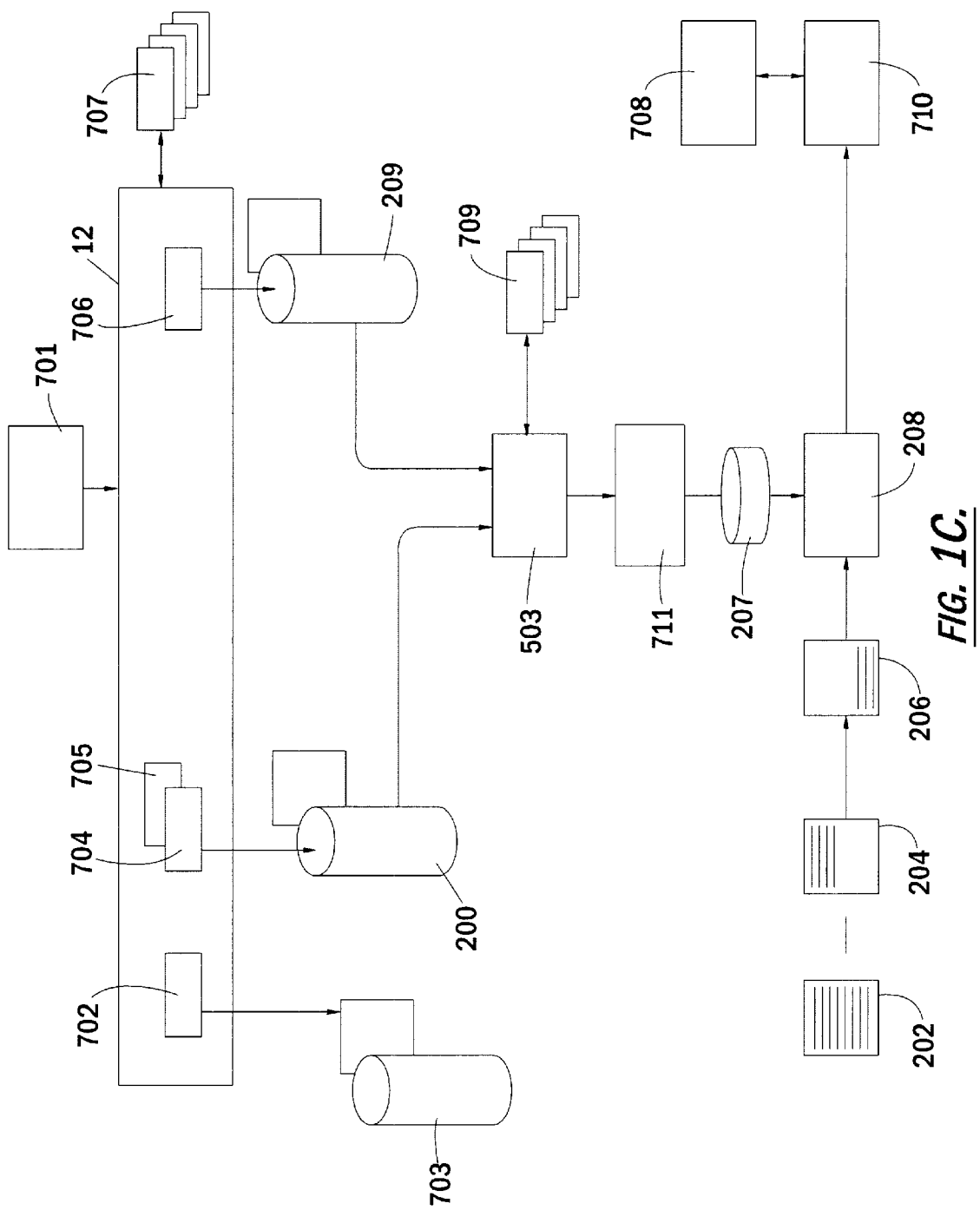
FIG. 1C is a schematic diagram of the functional components of the system of FIG. 1A.

FIG. 1A is a schematic diagram of the hardware of a preferred embodiment of a system 10 to address the problem solved by the present invention; FIG. 1B is a schematic diagram of a typical flow for a user through the functional components of the system; FIG. 1C is a schematic diagram of the functional components.

The system 10 incorporates a plurality of components (FIGS. 1A and 1C), including a control unit 12, comprising, for example, a microprocessor. Associated with the microprocessor 12 are read-only memory 14 and read-write memory RAM 16, which communicate with the processor 12 via a bidirectional bus structure 18. The memories 14,16, as is known in the art, can be used to permanently or temporarily store constants, programs being executed, or related data.

Also coupled to the bus 18 is a monitor, such as a CRT-type display 20, disk drive 24, CD-ROM drive 26, and a user input device 28. The user input device 28 may comprise, for example, a keyboard; it could alternately or in addition comprise a pointing device, such as a mouse, or touch screen.

A local area network (LAN) interface 30 enables the system 10 to communicate with the local network 31 (e.g., intranet). Further, a remote network interface 32 provides bidirectional communication with the World Wide Web or other remote networks (e.g., Internet), either through telecommunications or through other forms of data transmission without limitation.

In normal operation, software programs can be stored on and read from disk drive 24 or CD-ROM drive 26. Information can also be read from the CD-ROM drive 26. Both the disk drive 24 and the CD-ROM drive 26 can be used as sources from which databases can be accessed; alternatively, databases may be accessed via the LAN interface 30 or the remote network interface 32.

During normal operation of the system 10, visual information can be displayed on the display unit 20, whether being used by a user, system administrator, or management personnel, under control of the processor 12. Information can be read from disk drive 24 or CD-ROM drive 26 for the purpose of displaying same to the user/administrator/manager. A control program, or a suite of such programs, for the purpose of carrying out the processes of the present invention can be stored on one or both of disk drive 24 or CD-ROM 26 for access by processor 12. Processor 12 is thus able to carry out any of a number of prestored processes that provide for the multiplicity of functions to be described herein.

A overall interactive schematic of one aspect of the inventions which comprises a computer-based method of automatically determining and providing an individualized learning sequence, is illustrated in FIG. 1B. In this embodiment of the method, an organization has identified a skill area in which it desires for a known individual to gain proficiency, and learning tools are available for addressing this need.

In the system 10, the skills are assembled in a skills database 200. When an individual is needed to perform what may be a new skill or an existing skill at a higher skill level, an analysis of the skill possessed already by the individual 204 is performed to determine whether a "gap" 206 exists between the skill 204 and that needed by the organization 202. Preferably this analysis is performed electronically, with the use of gap generator software. The system 10, through the use of gap analysis software of the present invention, creates a complete set of training recommendations to satisfy the gap. An individual development plan 208 for the given skill comprises these training recommendations.

Figure 1D:
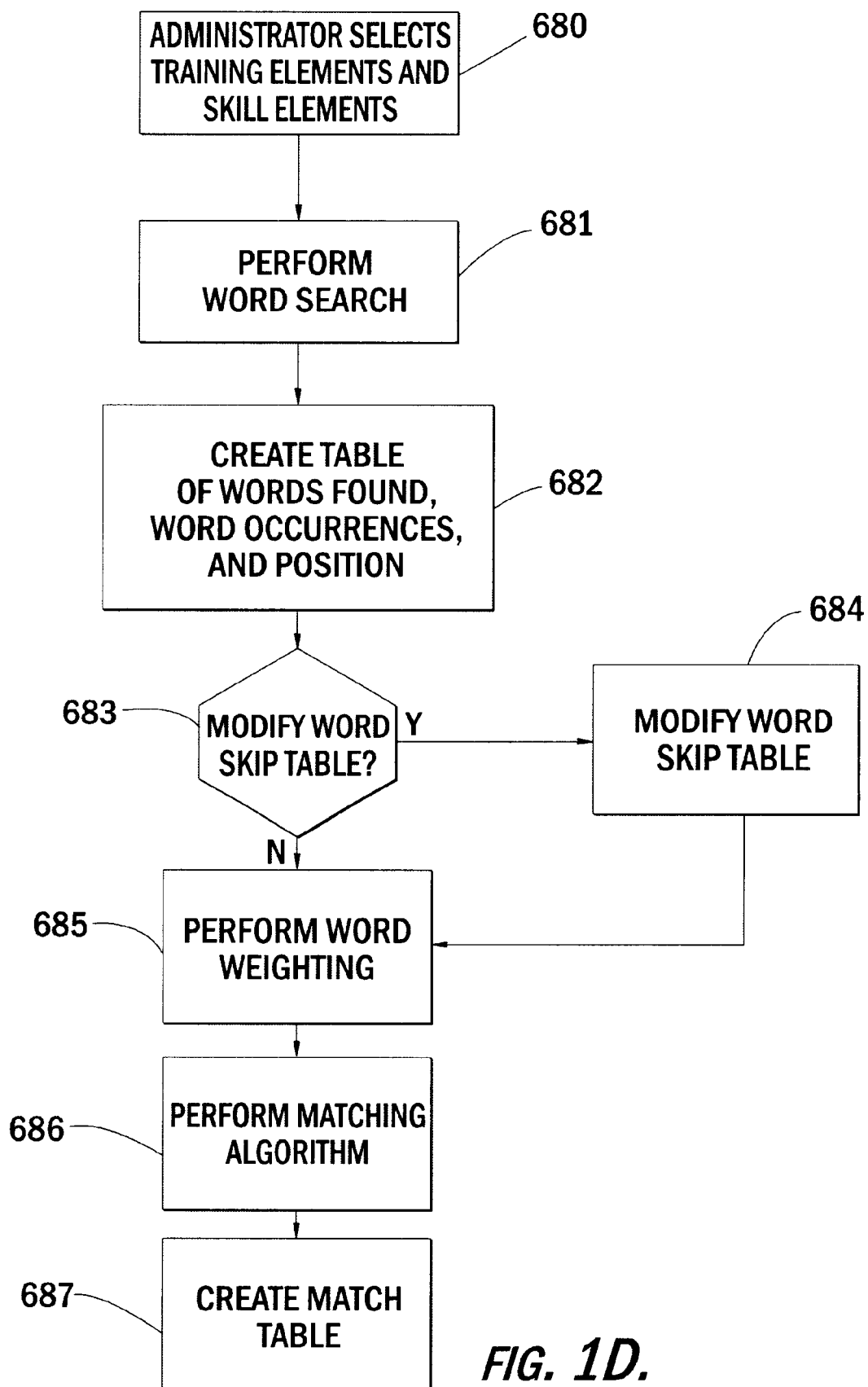
FIG. 1D is a flow diagram of the details of the matching process.
Figure 1E:
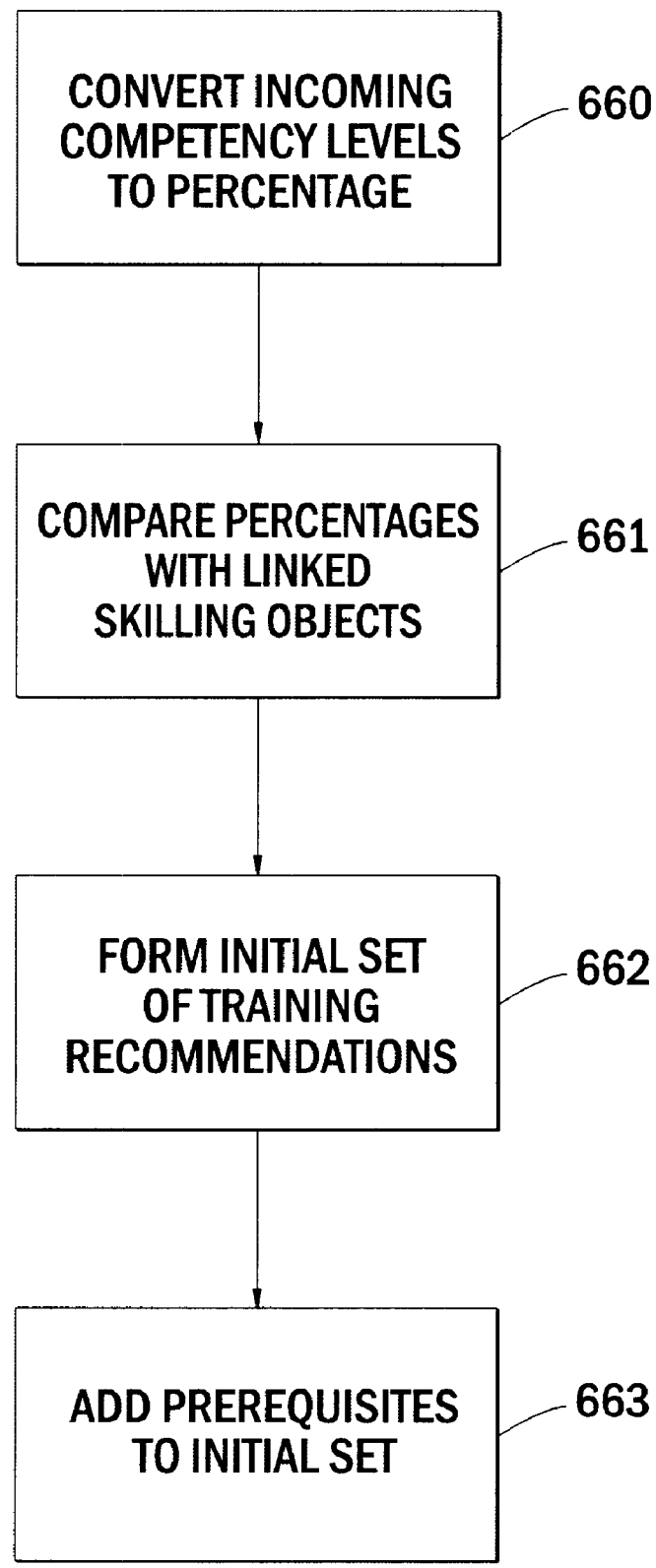
FIG. 1E is a flow diagram of the details of the gap analysis process.
Figure 1F:
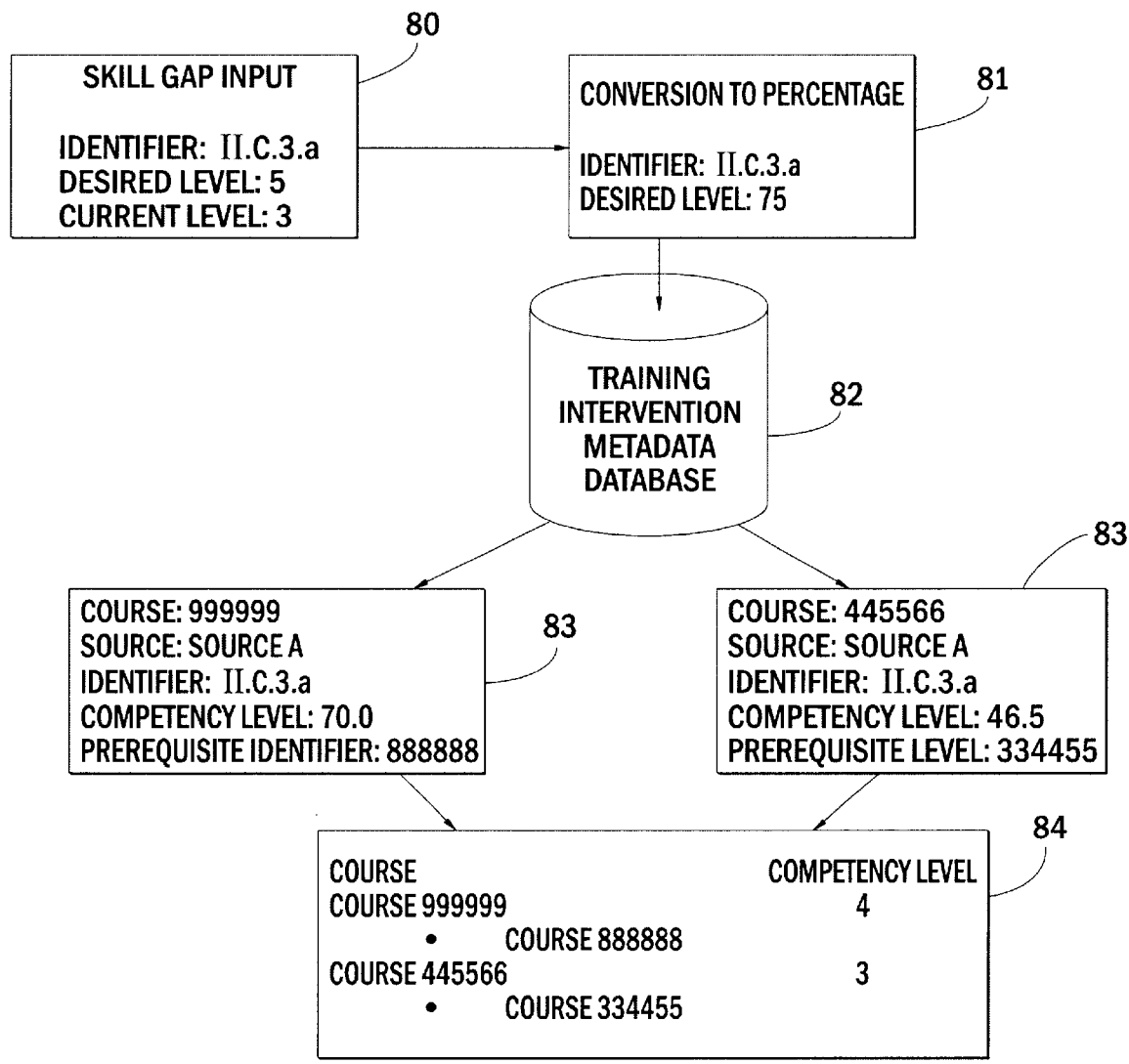
FIG. 1F is a schematic diagram of a typical flow through the gap analysis process and a resultant recommendation.

The system's 10 gap analysis software (FIGS. 1E and 1F) converts the two incoming competency levels 80, the user's current level and the desired level to be attained, to a decimal equivalent (percent) 81 (block 660). This normalizes the values so that proper comparison may be made between different competency rating scales. These percentages are then compared with all training interventions linked to the desired skilling object (block 661) in the training intervention metadata database 82. Linked training interventions whose competency levels are within the range set by the incoming levels (i.e., ≦the desired level and ≧current level) are identified as the initial set of training recommendations 83 (block 662).

A "complete" set of training recommendations 84 is accomplished by examining the prerequisite training intervention metadata element of each of the initial set of training recommendations. Prerequisites 85 are added to the initial set of training recommendations (block 663), and are indented or highlighted to indicate that they are "prerequisites" and not the primary training recommendations required to fill a skill gap.

The information contained in each training recommendation comprises the training intervention ID and the competency level and the prerequisite training intervention IDs.

If a gap 206 exists, data representative of the linkage between the required skill and skill level (i.e., competency level) to the appropriate set of training interventions in the training intervention metadata database 207 are used to create an "individual development plan" (IDP) 208. When desired, the course(s) to be taken from the regimen may be accessed from the course database 209.

Typically, not only a particular skill will be required, but also a predetermined level of skill. To this end the skills database 200 will also comprise the individual's skill level for each skill. In this case, the "gap" 206 further comprises a difference in skill level between that which the individual possesses in that skill and that desired by the organization.

The system flow then proceeds to administer a pretest 210, the results of which will determine an object-based curriculum 212 to be presented to the user. Following the user's studying the curriculum 212, a post-test 214 is retrieved and presented, the results of which are fed to the individual's skills database 204. Further, if the user does not achieve the desired skill level, further curriculum 212 is provided for study.

Figure 2A:
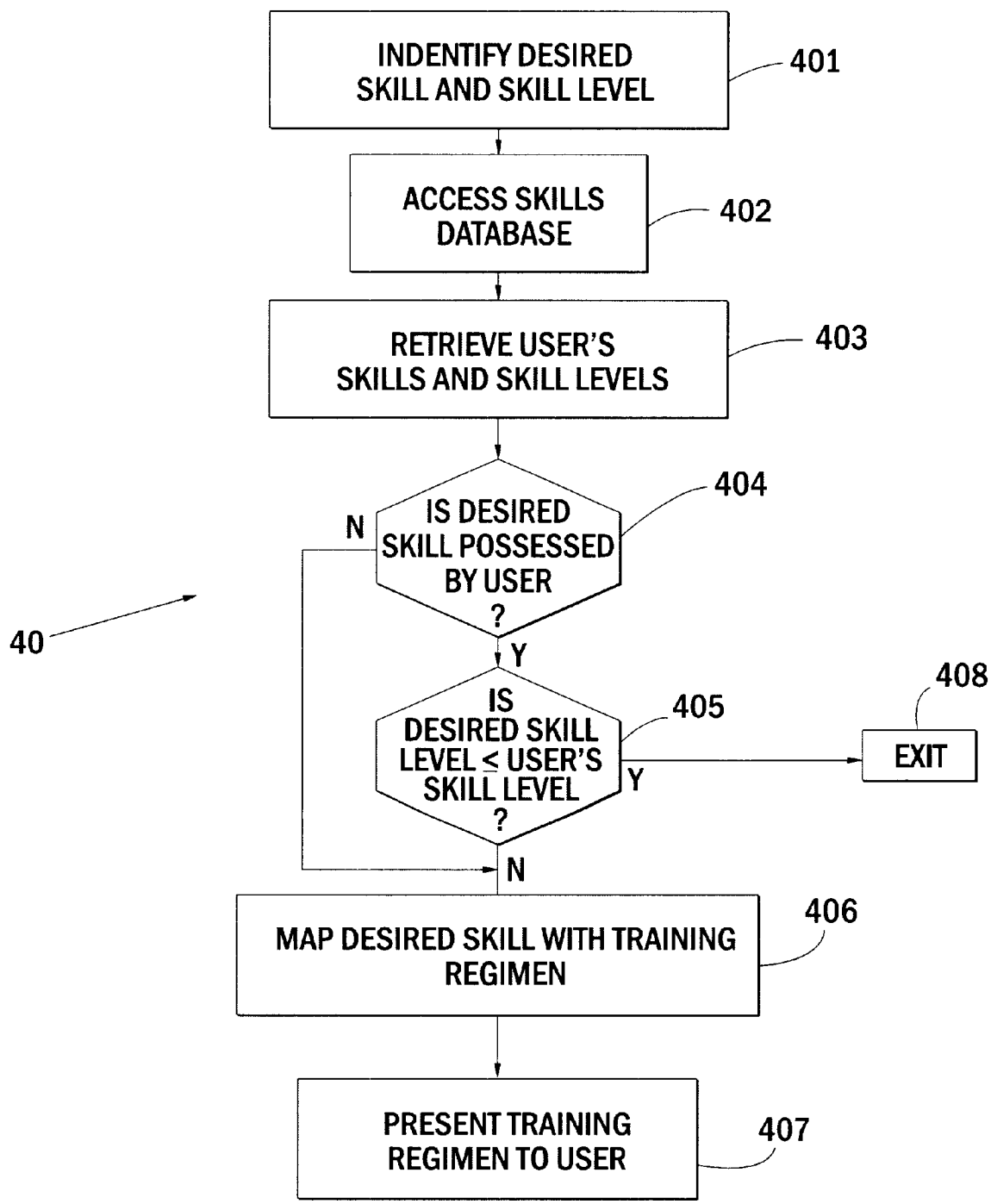
FIG. 2A is a flow diagram of the method for creating an individual development plan.

FIG. 2A is a flow diagram of the method 40 for creating an individual development plan. In this aspect of the method the organization, typically by way of a supervisor or manager, identifies a skill and skill level desired to be possessed by the user 401. The system 10 then accesses the skills database 402 and retrieves the user's skills and skill levels 403. If the desired skill is not already possessed by user 404, the desired skill is mapped with the appropriate training regimen 406. If the desired skill is already possessed by the user 404, the system then checks whether the desired skill level is less than or equal to the user's skill level 405. If so, the system exits 408. If the desired skill level is greater than that possessed by the user 405, the desired skill is mapped with the appropriate training regimen 406; that is, the skills domain is mapped to the training domain.

In some cases the gap 206 is sufficiently great that a plurality of courses will need to be assigned to the user. For example, if the user has a skill level of "1" for a particular skill, and the desired skill level is "5," the user will be assigned a training regimen comprising courses linked to skill levels 1 through 5 of that skill, so that all prerequisites are met en route to achieving the desired skill level.

Once the mapping has occurred 406, the training regimen is presented to the user 407. The types of information that may be obtained by the user is accessed via the metadata resident in a third database 207. The metadata comprise information that describes the attributes of a resource, the training regimen, and here serve as a link between the skills database and the mapping function of the system. Examples of metadata elements include, but are not intended to be limited to, an identifier (ID), a title of the training regimen, a description thereof, objectives therefor, duration, version, size, platform requirements, and prerequisites.

Figure 2B:
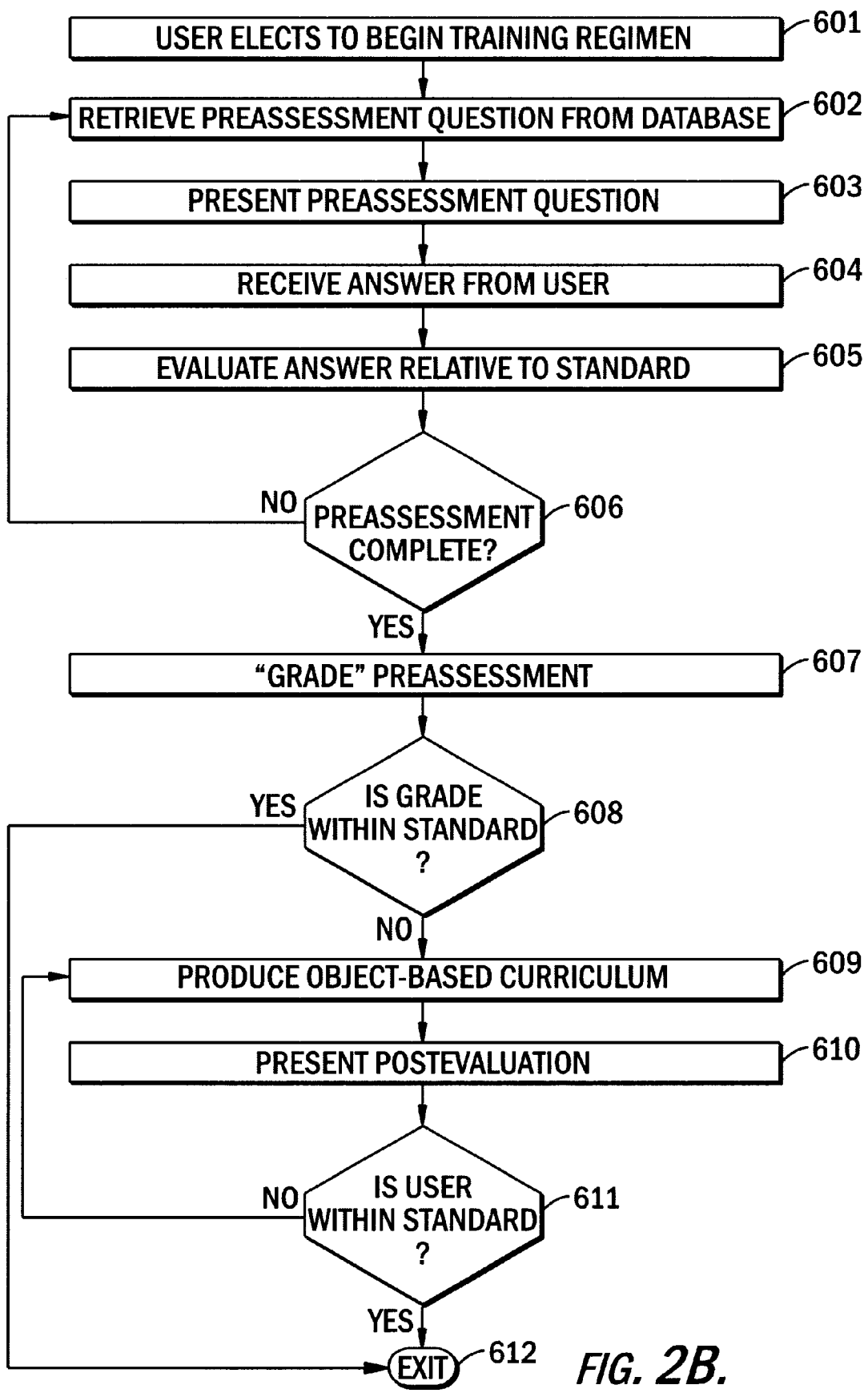
FIG. 2B is a flow chart of the steps of the user undergoing the recommended training regimen.

A block diagram for the user undergoing the recommended training regimen (FIG. 2B) includes the user's electing to begin the training regimen (block 601). The pretest is then commenced, with a preassessment question retrieved from the questions database (block 602) and presented to the user (block 603). The user enters an answer into an input device (block 604), and the answer is evaluated relative to a predetermined standard (block 605). If the preassessment is complete (block 606), the preassessment is graded (block 607); if not, another preassessment question is retrieved as above (block 602).

If the grade for the preassessment is within a predetermined standard range (block 608), the user may exit the system (block 612); if not, an object-based curriculum is produced (block 609). When the user has completed the curriculum, a postevaluation is presented (block 610). If the grade is sufficient (block 611), the user may exit (block 612); if not, the user returns to the curriculum (block 609).

A tabular depiction of the data flow comprising the mapping is given in FIGS. 3A and 3B, wherein a first table 41 contains the user skills and organization requirements from databases 204,202, including a column of skills 411, the user's current skill level 412, and the organization's desired skill level 413. From these data is generated a second table 42, demonstrating the "skills gap" for each skill, the first column 421 again comprising the skills, the second column 422 the user's current skill level, and the third column 423 the desired skill level. In this table 42, the rows of table 41 have been deleted wherein the user's skill levels matched or exceeded those required.

In a third table 43 a training map is formed, wherein each skill 431 that appears in the second table 42 is located in the metadata database, and mapped to all available courses 433 and their respective skill levels 432. Another important aspect of the invention is that a multiplicity of courses on the same skill having ascending skill levels may be defined hierarchically, so that an entry level is predefined for each course and a series of courses with ascending prerequisite skill levels included in the mapping. For example, in the table 44, five levels of courses, AA, FA, FB, AB, and AC, are recommended to achieve the desired skill level of 5 for Knowledge 1.

It should also be noted that an important aspect of the present invention is that the source of each course 433 is immaterial, as is the skill level range, and that any number of courses, levels, and sources thereof are in principle accessible by the system, so long as the metadata have been entered into the third database so that they may be accessed by the system 10.

Figure 4:
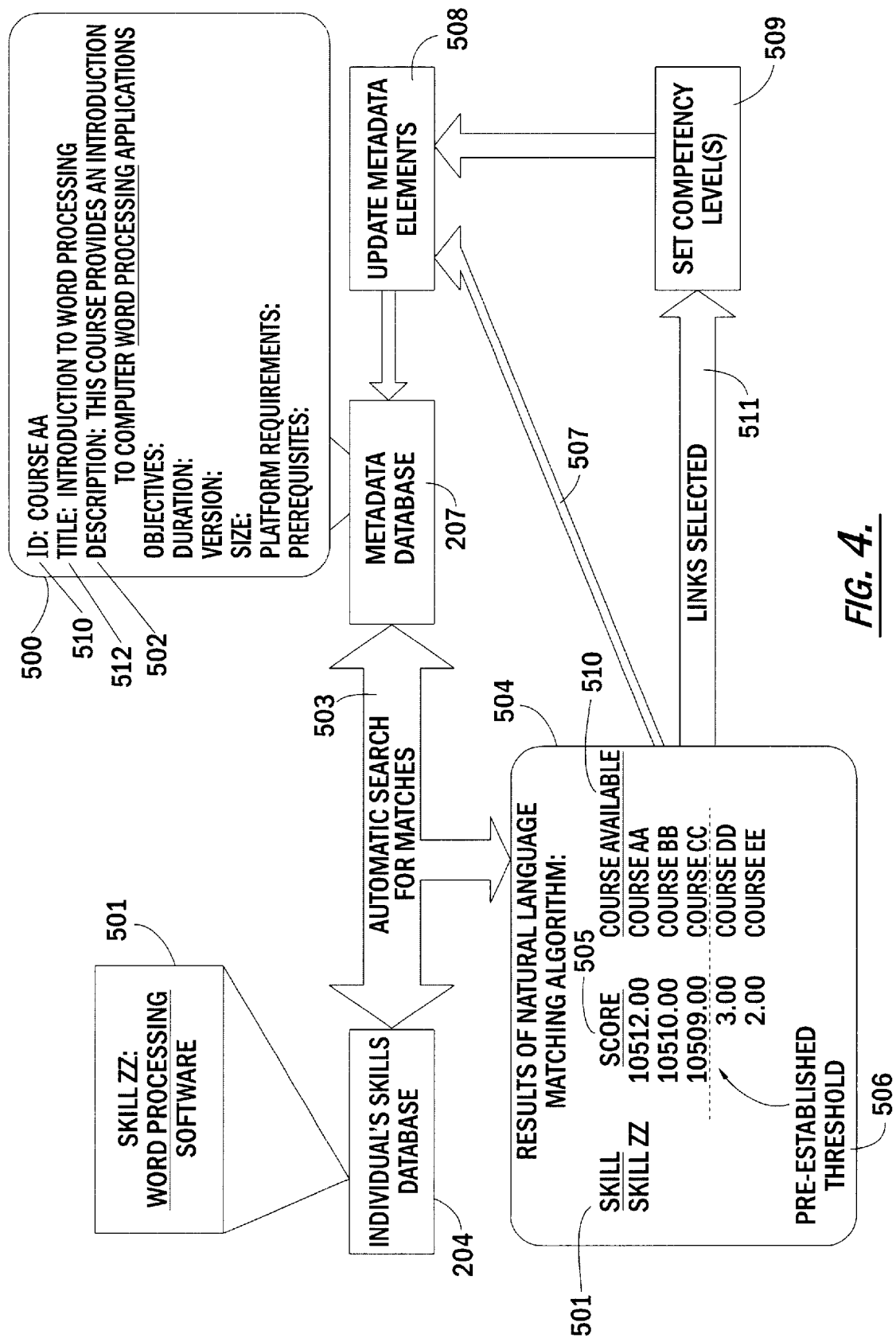
FIG. 4 is a schematic diagram of automatic matching, automatic linkage, and semiautomatic linkage for creating a training regimen.

As described previously, the metadata included in the metadata database 207 preferably include a "natural language" description of each course. A schematic diagram of automatic matching, automatic linkage, and semiautomatic linkage (FIG. 4) indicates that, at this point in the process, an ID of a skill in natural language 501 in the skills database 204 is automatically matched with a course description 502, as well as other metadata elements, such as title 512, also in a natural language, which is an element of the metadata set 500 for a course 510 (here Course AA) in the metadata database 207. A matching algorithm 503 resident in a processor provides the exemplary results shown in block 504. An important feature of the present invention is the ability for the administrator to select which training metadata element(s) and skilling object metadata element(s) the matching software examines, from one element to all elements. The matching algorithm 503 establishes probable matches between skills and training elements, creating a match table with probability scores that provide a high level of certainty for making links of training elements to skills during the linking process.

To describe the matching process in more detail (FIG. 1D), the administrator performs a "setup" procedure, which comprises selecting metadata elements for each course and skill that are to be considered, such as course title, course description, objectives, etc. (block 680). These selected "operating elements" (Table 1), such as title, description, discipline, etc., are taken from a table containing course information (Table 2) and skills (Table 3). The selected operating elements are then fed to a "harvest" program, which searches through all the words in the operating elements (block 681) and establishes a table (block 682) that contains a list of words found, the number of times each word occurred, and position of each word in the searchable operating elements. The positions of the words may be used during the matching step to give "bonus" points to matches that contain like phrases or word groupings. For example, "software programming" found in a training element and a skill element would provide bonus points in the match score.

TABLE 1

| SourceTable | SourceKeyCol | SourceValCol |
|---|---|---|
| Courses | CourseID | CourseTitle |
| Courses | CourseID | CourseOverview |
| Courses | CourseID | CourseObjectives |
| Skills | ObjID | Title |

TABLE 2

| CourseID | CourseTitle | CourseOverview | CourseObjectives |
|---|---|---|---|
| 12663 | C++ Programming Fundamentals - Part 1 | This is the first course in a two-part course covering the fundamentals of programming with the C++ programming language. This series will show you how to get the benefits of | Use C++ classes and functions. Use C++ objects, data types, inline functions and referencing. Use composition and association in C++ programs. |

TABLE 3

| ObjID | SkillType | Title |
|---|---|---|
| KNOW1012 | KNOW | Programming Languages: |
| TOOL412 | TOOL | Oracle |
| KNOW581 | KNOW | Television Programming |
| TOOL584 | TOOL | UNIX (Solaris BSD, etc.) |

The administrator then runs a weighting program (block 685), which compares the words in the word table with a word skip table, which contains a list of words that are to be ignored in the weighting process, such as "a," "an," "the," etc. If desired (block 683), the administrator can modify the word skip table (block 684) prior to running the weighting program (block 685). The weighting program assigns a value to the word, shown as a "1" in Table 4, to those words that should be skipped during the matching process.

TABLE 4

| Id | Word | Count | Skip |
|---|---|---|---|
| 354 | C++ | 7 | 0 |
| 355 | programming | 6 | 0 |
| 382 | and | 5 | 1 |
| 361 | the | 4 | 1 |
| 392 | use | 3 | 1 |
| 364 | in | 3 | 1 |
| 394 | functions | 2 | 1 |
| 368 | of | 2 | 1 |
| 363 | course | 2 | 1 |
| 359 | this | 2 | 1 |
| 357 | part | 2 | 1 |
| 356 | fundamentals | 2 | 1 |
| 375 | how | 1 | 1 |
| 371 | series | 1 | 1 |
| 373 | show | 1 | 1 |
| 376 | to | 1 | 1 |
| 372 | will | 1 | 1 |
| 374 | you | 1 | 1 |
| 370 | language | 1 | 0 |
| 369 | with | 1 | 1 |
| 367 | covering | 1 | 1 |
| 365 | a | 1 | 1 |

TABLE 4-continued

| Id | Word | Count | Skip |
|---|---|---|---|
| 379 | good | 1 | 1 |
| 362 | first | 1 | 1 |
| 360 | is | 1 | 1 |
| 358 | 1 | 1 | 1 |
| 366 | two | 1 | 0 |
| 389 | techniques | 1 | 1 |
| 402 | programs | 1 | 0 |
| 401 | association | 1 | 0 |
| 400 | composition | 1 | 0 |
| 399 | referencing | 1 | 0 |
| 398 | inline | 1 | 0 |
| 397 | types | 1 | 1 |
| 396 | data | 1 | 1 |
| 395 | objects | 1 | 0 |
| 393 | classes | 1 | 0 |
| 377 | get | 1 | 1 |
| 390 | business | 1 | 1 |
| 378 | benefits | 1 | 1 |
| 388 | oriented | 1 | 0 |
| 387 | object | 1 | 0 |
| 386 | using | 1 | 1 |
| 385 | by | 1 | 1 |
| 384 | reuse | 1 | 0 |
| 383 | code | 1 | 0 |
| 381 | engineering | 1 | 0 |
| 380 | software | 1 | 0 |
| 403 | languages | 1 | 0 |
| 391 | applications | 1 | 1 |
| 415 | oracle | 1 | 0 |
| 416 | television | 1 | 0 |
| 417 | unix | 1 | 0 |
| 418 | solaris | 1 | 0 |
| 419 | bsd | 1 | 0 |
| 420 | etc | 1 | 1 |

The weighting program also creates a phrases table, Table 5, that contains two-, three-, and four-word phrases or word groupings. These phrases are used during the matching program to give "bonus" points to the total match score. For example, "software programming" in a training intervention element and a skilling object element would provide additional bonus points in the total match score.

TABLE 5

| id | Phrase | ObjID | Count |
|---|---|---|---|
| 2435 | business applications | 12663 | 1 |
| 2431 | c++ programming | 12663 | 2 |
| 2433 | c++ programming language | 12663 | 1 |
| 2434 | c++ programs | 12663 | 1 |
| 2439 | inline functions | 12663 | 1 |
| 2441 | language c++ | KNOW1012 | 1 |
| 2436 | object oriented | 12663 | 1 |
| 2437 | object oriented programming | 12663 | 1 |
| 2438 | oriented programming | 12663 | 1 |
| 2443 | programming language | KNOW1012 | 1 |
| 2444 | programming language | 12663 | 1 |
| 2442 | programming language c++ | KNOW1012 | 1 |
| 2440 | television programming | KNOW581 | 1 |
| 2445 | c++ objects | 12663 | 1 |
| 2446 | c++ class | 12663 | 1 |

The weighting program further contains a function that allows the administrator to insert words into a word weight table and assign a weight (normally a value other than the default weight value of "1") to these words. This table, an example of which is found in Table 6, thereby allows the administrator to enhance the probability of valid matches due to known words in the training intervention metadata elements that are used by many different training interventions. For example, if the word "Microsoft" were used in describing many training interventions, the weight may be reduced to a value less than "1." The administrator would complete the word weight table before running the matching program.

TABLE 6

| ID | Word | Weight |
|---|---|---|
| 14 | microsoft | 0.012 |
| 15 | server | 0.0096 |
| 16 | network | 0.024 |
| 17 | system | 0.047 |
| 18 | software | 0.275 |
| 19 | information | 0.092 |
| 20 | management | 0.046 |
| 21 | application | 0.089 |
| 22 | window | 0.0093 |
| 23 | lotus | 0.091 |

The match program is then utilized to perform a mathematical calculation on the tables (block 686) and create a match table (block 687) that shows which training interventions are matched to skilling objects with corresponding scores reflecting the probability of valid matches (Table 7). A score is calculated that, in an exemplary embodiment, is the sum of three scores. The higher the score, the higher the probability that a selected course supports the skill desired.

Score 1. An exemplary algorithm for calculating Score 1 is as follows, with the calculation performed for each word from word #1 to word #n in the skill and every course (i.e., training intervention). This score looks at each word in the skilling object and compares it to the words in each training intervention. If words are duplicated in the skilling object's words, the calculation is only performed once for each word. The software adjusts for singular and/or plurals. For example, a singular form of a word found in the training intervention and a plural form found in the skilling object are treated as equal. A default word weight value of "1" is given for each word unless modified by the word weight table.

Score 1=[(count of word #1 in course operating elements)(weight of word #1)]+[(count of word #2 in course operating elements-)(weight of word #2)]+ . . . +[(count of word #n in course operating elements)(weight of word #n)]

Score 2. For each combination of two, three, or four words in the skilling object's words that match two, three, or four word combinations in the training intervention's words, bonus points (normally 500 for each match) are added to Score 2. The maximum score for Score 2 is set to 9000 (500×18 occurrences). The value of the bonus points for the two-, three-, or four-word phrase matches is adjustable by the administrator, but the maximum score for Score 2 cannot exceed 9000.

Score 3. Score 3 is obtained by comparing the words in the skilling object's and training intervention's "discipline" elements. An exact match places 10,000 points into Score 3. Score 3 may or may not be used, at the discretion of the administrator during the setup procedure. If the administrator knows that a common "discipline" element exists for some or all skilling objects and training interventions, he/she would select the elements that will be compared for establishing Score 3. If the element is selected for establishing Score 3, the element cannot be used in the Score 1 or Score 2 calculations.

In this method, Score 1 alone shows the relationship of words, without a high probability of the same contextual meaning between the skilling object and training intervention. A Score 1 value above 10 is typically a good indicator that a valid relationship exists.

A Score 2 value between 500 and 9000 indicates an increased probability of a valid relationship because of the combination of words or "like phrases." The higher the score for Score 2, the higher the probability of a valid relationship.

By adding Score 3 to Score 1 and Score 2, the probability of a valid relationship increases dramatically, because it tells us that the skilling object and the training intervention involve the same subject matter (e.g., mathematics, chemistry, information technology, leadership, etc.). For example, a total score of 19,053 would indicate a valid relationship of the skilling object and the training intervention. In this example, both the skilling object and the training intervention could have indicated that the discipline is "IT Tools" (Score 3=10,000). There are at least 18 occurrences of matched two-word phrases such as "Microsoft Access" (Score 2=500×18=9000), and 53 occurrences of a word in the training intervention elements that match a word in the skilling object (Score 1=53).

Table 7 is an example of a Match Table showing a total score consisting of Score 1+Score 2 and all word weights equal to "1." This table is the result of running the matching software of the present invention on the operating elements of Table 1; the training intervention used is shown in Table 2; the skilling objects in Table 3; the results of the word skip table on the words table in Table 4, with the "1"s indicating that the words were not used in the calculation; and Table 5 showing the phrases.

TABLE 7

Match Table

| ID | ObjID | CourseID | Score |
|---|---|---|---|
| 41 | KNOW1012 | 12663 | 511.0 |
| 42 | KNOW581 | 12663 | 4.0 |

Returning to FIG. 4, the "score" 505 as calculated by the matching algorithm 503 for the results of the mapping of the skill ID 501 to the course description 502 is tabulated. A threshold level 506, which is selectable by the administrator, provides a cutoff below which a course 502 is not considered. The administrator can also select matches "manually" and create desired links in the neighborhood of the threshold 506. With automatic linkage 507 the system 10 proceeds directly to updating the appropriate course metadata element(s) 508 in the metadata database 207; with semiautomatic linkage 511 the administrator intervenes by setting a desired competency level 509 prior to updating the metadata element(s) 508. The automatic linkage 507 establishes the association of the skill to the course. The semiautomatic link 511 establishes the competency level acquired from the course, as well as the association.

Specifically, the administrator creates links along the automatic pathway 507 or the semiautomatic pathway 511 by a combination of:

1. Selecting all matches for a range of scores (i.e., setting the lower and higher scores results in all matches equal to or greater than the lower score but less than or equal to the higher score to be linked) or above a selectable threshold level;

2. Selecting one match at a time (i.e., link the one match selected); or

3. Selecting multiple matches (i.e., highlighting various matches and then linking them all simultaneously).

The linking software of the present invention permits the administrator to view matches in a "linking screen," a portion of which is illustrated in Table 8.

TABLE 8

Portion of the Linking Screen

| id | ObjID | CourseID | Skilling Object Title | Training Intervention Title | Total Score |
|---|---|---|---|---|---|
| 41 | KNOW1012 | 12663 | Programming Languages: | C++ Programming Fundamentals – | 511.0 |
| 42 | KNOW581 | 12663 | Television Programming | C++ Programming Fundamentals – | 4.0 |

The administrator may view matches on the linking screen in a plurality of ways, including: by skilling object type; by skilling object identifier or group (e.g., "KNOW5" displays all matches of skilling objects with IDs of "KNOW5xx"); by training intervention ID or group (e.g., "123" displays all matches of training interventions with IDs of "123xx"); by match scores above or below a score; by exact match score or group (e.g., "5*" displays all scores between 50.0 and 59.9); all matches by skilling object or training intervention. The linking software further permits sorting the information in any column, in ascending or descending order.

When the administrator makes a link, by selecting a "Link" button on the screen, the match is removed from the match table so that the administrator can continue the linking process on remaining matches if desired. If the administrator subsequently removes a link, the match information is restored into the match table.

When the linking process is complete, the administrator then can call up a screen that permits viewing the training intervention metadata elements. When a particular training intervention is selected, the metadata are displayed along with all links to skilling objects. The administrator can then insert or modify the competency level for any linked training intervention. If the administrator wishes, he/she can also select a skilling object to see which training interventions are linked to it and insert or modify the competency level for any linked training intervention.

Returning to FIG. 3B, in a fourth table 44 a training plan is formulated, containing a column 441 of required skills and a column 442 of respective courses to be taken by the user. Thus it may be seen that the system precisely maps the training to the desired tasks, tools, and knowledge required by the organization. The table 44 is created dynamically, based on the user's gap information received by the gap analysis software and the links that were established during the linking process.

Another aspect of the present invention comprises a system and method for creating/updating the skilling object metadata database 204 and training metadata database 207, including creating skilling object linkages within the training metadata database 207, which is an integral feature to providing an automated or semiautomated linking framework for creating individualized training regimens. Creating/updating the training metadata database 207 is accomplished by importing training intervention metadata from any desired source into an input means of the system 10 as is known in the art, or, in some cases, providing a linkage to an external source, such as via an intranet or internet.

In an automated linking framework the results of a matching algorithm are fed to a system 508 for updating the metadata database 207. In a semiautomated matching framework the results of the matching algorithm are passed to an intermediate step 509, wherein competency level(s) may be set prior to updating the metadata database 207. Also, setting a competency level may be accomplished anytime after links have been established through automatic linkage 507.

More specifically, the software adapted to perform updates when a user adds or changes a training intervention or a skilling object. This software reconciles the differences and focuses on the impact of the new or changed training intervention or skilling object on linkages and/or competency levels.

Figure 5:
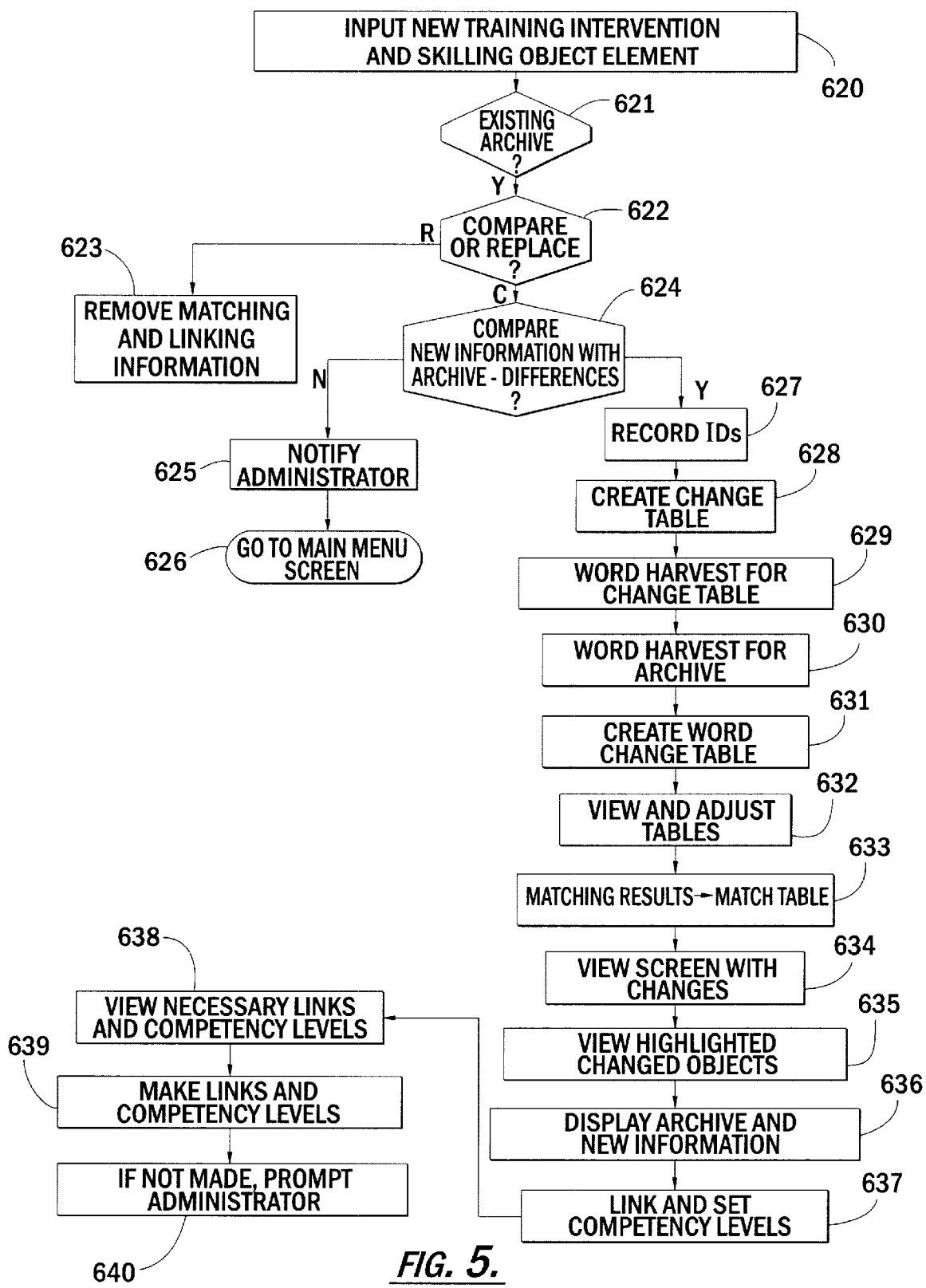
FIG. 5 is a block diagram of the updating process.

If the administrator initiates a transfer of revised information from an external source (e.g., a learning management system, human resource system, skills management system, CD-ROM, etc.), the update software compares the new information with previously archived information to determine if changes exist and allows the administrator to make necessary updates to the linkages. This process (FIG. 5) comprises the following steps in an exemplary embodiment:

1. The administrator initiates an input of a new training intervention and skilling object element through the input/output interface (block 620). If there is an existing archive (block 621), the software queries the administrator as to whether it is desired to "compare" for differences or to "replace" (block 622). "Replace" removes all matching and linking information in the database (block 623).

2. If the administrator selects "compare" (block 622), the software compares the new information in the current database with the archive (block 624). If there are no differences, the software notifies the administrator (block 625) and then branches to the "main menu" screen (block 626). If there are differences, the software records the identifiers (IDs) of the objects (either new or modified objects) (block 627) and creates a "change table" that lists the IDs of the subject objects (block 628).

3. The software then performs a word harvest on the current database for the IDs contained in the change table (block 629) and a word harvest on the archive for any IDs in the change table that exist in the archive (block 630).

4. The software then compares the two word harvests and creates a "change word table" that reflects the differences in word counts, word positions, and phrases (block 631).

5. After allowing the administrator the opportunity to view the change word table and to make any desired adjustments to the word skip or word weight tables, the software then modifies the words table based on the differences in the change word table (block 632).

6. The software then runs the matching utility, and places the results in the match table (block 633).

7. The software then allows the administrator to view a screen that shows the changes by training intervention (Table 9) or skilling object (Table 10; block 634). The example shown in Tables 9 and 10 assumes that the information in training intervention "T1" and skilling object "C" has been modified and that there are two new skilling objects, "F" and "G."

TABLE 9

Training Intervention View

| Training Intervention ID | Training Intervention Title | Skilling Object ID | Skilling Object Title | Archive Match Score | New Match Score | Link Y/N/? | Competency Level |
|---|---|---|---|---|---|---|---|
| T1 | Title 1 | A | Title ABC | T1AA1 | T1AA2 | Y | 51.5 |
|  |  | B | Title DEF | T1BB1 | T1BB2 | Y | 30.0 |
|  |  | C | Title GHI | T1CC1 | T1CC2 | N | — |
|  |  | F | Title PQR |  |  | ? | — |
| T2 | Title 2 | C | Title GHI | T2CC1 | T2CC2 | Y | 35.0 |
|  |  | D | Title JKL | T2DD1 | T2DD2 | Y | 70.0 |
|  |  | E | Title MNO | T2EE1 | T2EE2 | Y | 50.5 |
|  |  | F | Title PQR | — | T2FF2 | ? | — |
| T9 | Title 3 | F | Title PQR | — | T9FF2 | ? | — |
|  |  | G | Title STU | — | T9GG2 | ? | — |

TABLE 10

Skilling Object View

| Skilling Object ID | Skilling Object Title | Training Intervention ID | Training Intervention Title | Archive Match Score | New Match Score | Link Y/N/? | Competency Level |
|---|---|---|---|---|---|---|---|
| C | Title GHI | T1 | Title 1 | T1CC1 | T1CC2 | N | — |
|  |  | T2 | Title 2 | T2CC1 | T2CC2 | Y | 35.0 |
| F | Title PQR | T1 | Title 1 | — | T1FF2 | ? | — |
|  |  | T2 | Title 2 | — | T2FF2 | ? | — |
|  |  | T9 | Title 9 | — | T9FF2 | ? | — |
| G | Title STU | T9 | Title 9 | — | T9GG2 | ? | — |

8. Both views display every object affected by the changes, the titles of the object and training intervention, the archive match score, the new match score, any links that were previously made, and the corresponding competency levels. Additional features of these views include:
   a. Modified and new objects are highlighted (here shown in boldface) to make it easy for the administrator to identify them from unchanged objects (block 635).
   b. Double clicking on an object (training intervention or skilling object) displays a window that shows the archive information and the new information (block 636). This allows the administrator to make judgments on the impact of the new information on links. Obviously, new objects would not have previous information.
   c. The provision to link (by individual selections, above a threshhold or between scores) and to set the competency levels provided (block 637).
   d. The link for each new or modified object is initially shown as a question mark (?), and its corresponding competency level is shown as a dash (–) (block 638). This facilitates the administrator's being able to see which links and competency levels have to be made.
   e. All links and competency levels for the changed objects should be made before exiting the update software (block 639). If the administrator exits the update software without making a link and competency determination for every new object (i.e., changing the "Link" column to either "N" or "Y" and setting the competency level for every Y), the software prompts the administrator (block 640), indicating that all links and competency levels for the changed objects were not made and that the working data will be saved to be worked on at a later time.

9. If the administrator exits the update software without completing the links and competency levels, the software provides a prompt to the administrator each time the program is entered.

FIG. 1C represents the functional interplay between system elements for two anticipated accessors of the system 10: an administrator and a user/employee. The administrator's tasks include: (1) load/manage training metadata database; (2) load/manage skilling object metadata database; (3) maintain system configurations; (4) view training intervention metadata elements; (5) view skilling object metadata elements; (6) run software utilities; (7) link training interventions to skilling objects and set corresponding competency levels; and (8) prepare reports. The manager's tasks include: (1) view available courses; (2) view available skills; (3) search courses; (4) create/manage collections of courses based on existing objects; (5) match skills to courses; and (6) report progress. The user's tasks include: (1) select skills needed based on the gap analysis; (2) generate an individual development plan; and (3) send a curriculum to a course management system. The division of tasks within the system 10 are summarized in Table 11.

TABLE 11

Precision Skilling Functions

| Function | Input/Output The Administrator |
|---|---|
| 1. Input Initial Skilling Object and Training Intervention Metadata Elements | Controls the transfer of the training intervention and skilling object metadata elements from the LMS to the PS database at the onset. |
| 2. Input Updated Skilling Object and Training Intervention Metadata Elements | (See Update Software) |
| 3. Output database tables to LMS | Controls the transfer of PS database tables to the LMS and/or removable media. |
| 4. Provide reports | Creates the following reports:<br>1. Linked Skilling Objects - A listing of all linked skilling objects and the corresponding training interventions with competency levels.<br>2. Linked Training Interventions - A listing of all linked training interventions with competency levels and the corresponding skilling objects.<br>3. Unlinked Skilling Objects - A listing of all unlinked skilling objects.<br>4. Unlinked Training Interventions - A listing of all unlinked training interventions. |
| Function | The Employee |
| Accept Skilling Object Gap Information. | Via the LMS Gap Generator, initiates the sending of the gap information to PS. |

| | Matching Software |
|---|---|
| Function | The Administrator |
| 1. Setup Utility | Selects which skilling object and training intervention metadata elements will be used in the Harvest and Match programs. |
| 2. Harvest Utility | Executes the Harvest Utility software that searches through all of the words in the training intervention and skilling object metadata operating elements to establish:<br>1. The Words Table which contains:<br>  a) a listing of words found, and<br>  b) the number of times each word was found.<br>2. The juncWords_Courses Table that records the position of each word in the training intervention operating elements.<br>3. The juncWords_Skills Table that records the position of each word in the skilling object operating elements. |
| 3. Weight Utility | 1. May modify the Word Skip Table prior to initiating the execution of the Weight Utility software.<br>2. Executes the Weight Utility software that:<br>  a) Compares the Word Table to the Word Skip Table. Words in the Words table that are found in the Word Skip Table are set to "1", indicating they will be skipped (i.e., ignored) during the Match Utility.<br>  b) Creates a Phrases Table that contains two and three word phrases or groupings. These phrases will be used during in the Matching Utility to give "bonus" points for phrase matches found in the training intervention and the skilling object.<br>3. Insert words and corresponding weights into the Word Weight Table to enhance the probability of valid matches due to known words in the training intervention metadata elements that are used by many training interventions. The word weights |

TABLE 11-continued

Precision Skilling Functions

| | |
|---|---|
| 4. Match | would normally be set to a value less than "1" (the default weight for each word). Executes the Match Software that computes a score of probable valid match for each skilling object to training intervention (i.e., the training intervention supports the skilling object). The resulting Match Table provides a listing of probable valid matches with corresponding scores. The total match score is the sum of three individual scores (see Match Utility paragraph for details). |

Linking Software

| Function | The Administrator |
|---|---|
| 1. Link Training Intervention(s) to Skilling Object(s) | Examines the contents of the Match Table via a Linking Screen to select which matches are valid matches and executes the Link Software that records the link to the skilling framework discipline in the training intervention metadata element (Classification.Purpose (Discipline).TaxonPath). The administrator makes links by combination of: 1. selecting all matches between two match values, 2. selecting one match at a time (i.e., link the one match selected), or 3. selecting multiple matches (i.e., highlighting various matches and then linking them all at the same time). Once a link is made, the match information for that link is removed from the Linking Screen. |
| 2. Setting Competency Levels | 1. Selects a screen where he/she can select: a) A single training intervention b) Grouping of training interventions (e.g., all 123xx courses) c) All training interventions 4. Then calls up the training intervention metadata for examination. 5. Enters the competency level for the link to each skilling object (i.e., at what competency level does this training intervention support each of the linked skilling objects). |
| 3. Change Competency Levels | 1. Selects a screen where he/she can select: a) A single training intervention b) Grouping of training interventions (e.g., all 123xx courses) c) All training interventions 4. Then calls up the training intervention metadata for examination. 5. Changes the competency level for any link to a skilling object (i.e., at what competency level does this training intervention support each of the linked skilling objects). |
| 4. Delete a Link | 1. Selects a screen where he/she can select: a) A single training intervention b) Grouping of training interventions (e.g., all 123xx courses) c) All training interventions 2. Then calls up the training intervention metadata for examination. 3. Deletes any link to a skilling object. Note: Any link that is deleted results in having the original match information placed back into the Linking Screen. |

Update Software

| Function | The Administrator |
|---|---|
| 1. Input Updated Skilling Object and Training Intervention Metadata Elements | 1. Initiates the input of the new training intervention and skilling object elements through the Input/Output Interface. 2. If there is an existing archive (i.e., Precision Skilling has previously operated on the elements), the Update Software queries the administrator as to whether he/she wants to "Compare" for differences or to "Replace". "Replace" removes all matching and linking information in the current database. NOTE: Replacement is not normally done in an operational environment. 3. If the administrator selects "Replace", the software branches to the 'Main Menu' screen. 4. If the administrator selects 'Compare', the software compares the new information in the current database with the archive.   a) If there are no differences, the software notifies the administrator and then branches to the 'Main Menu' screen   b) If there are differences, the software records the identifiers (ID's) of the objects (either new or modified objects) and creates a "Change Table" that lists the ID's of the subject objects.     1) The software then performs a word harvest on the current database for the ID's contained in the Change Table and a word harvest on the archive for any ID's in the Change Table that exist in the archive.     2) The software then compares the two harvests and creates a "Change Word Table" that reflects the differences in word counts.     3) The software pauses to allow the administrator the opportunity to view the Change Word Table and to make any adjustments to the Word Skip or Word Weight tables |
| 2. Adjust Word Skip and Word Weight Tables 3. Access impact of changes on link information | The administrator views the Change Word Table and to make any adjustments to the Word Skip or Word Weight tables. 1. When finished with any changes he/she might make, the administrator resumes the Update software.   a) The software then modifies the "Words Table" based on the differences in the Change Word Table.   b) The software then runs the Match Utility on the changed training intervention and skilling object metadata databases, placing the results in the Match Table.   c) The software then allows the administrator to view a screen that shows the changes by training interventions or skilling objects. Both views display every object affected by the changes, the titles of the skilling object and training intervention, the archive match score, the new match score, any links that were previously made, and the corresponding competency levels. Modified and new objects are highlighted to make it easy for the administrator to identify them from unchanged objects. 2. The administrator then selects (e.g., double clicking on the object) an object (training intervention or skilling object) to have the software display a window that |

TABLE 11-continued

Precision Skilling Functions

| | |
|---|---|
| | shows the archive information and the new information. This allows the administrator to make judgements on the impact of the new information on links. Obviously, new objects would not have previous information. |
| 4. Update Link Information | If the administrator determines changes are needed to the link information or there are new objects (training interventions or skilling objects), he/she inserts the appropriate information.<br>1. The software provides the capability for the administrator to link (by individual selections, between scores, or above a threshold score) and to set the competency levels.<br>2. The software initially shows the link for each new or modified object as a question mark (?) and its corresponding competency level as a dash (-). This makes it easy for the administrator to see which links and competency levels he/she has to make.<br>Note 1: All links and competency levels for the changed objects should be made before the administrator exits the Update Software. If the administrator exits the Update Software without making a link and competency determination for every new object (i.e., changing the Link column to either N or Y and setting the competency level for every Y), the software prompts the administrator indicating that all links and competency levels for the changed objects were not made and that the working data will be saved to be worked on at a later time.<br>Note 2: If the administrator exits the Update Software without completing the links and competency levels, the software provides a prompt to the administrator each time he/she enters Precision Skilling. |

Gap Analysis Software

| Function | The Software |
|---|---|
| 1. Accept Gap Information | Receives information for one skilling object gap |
| 2. Convert Gap Levels to Percentages | The software converts the levels to percentages only if the gap levels are not in percentages. Note: The administrator establishes whether to convert or not convert based on the client's rating scales. It may be possible for a client who is supporting several skill frameworks to have some gaps generated as percentage and others as simple rating scales (with decimals). |
| 3. Compile the List of Training Interventions | 1. The software examines the Skilling Object ID to compile a list of linked training interventions with competency levels that fall within the range of the "desired" level and the "actual" level.<br>2. For every training intervention identified in the list, the software looks at the Training Intervention "Prerequisite" element and adds the prerequisites to the list. |
| 4. Send the Training Interventions to the LMS | The software sends an ordered list of training interventions to the LMS. Each training intervention in the list includes:<br>1. The Training Intervention ID<br>2. The Competency Level of the training intervention for the skilling object expressed in the form received by the LMS (i.e., single digit, with or without fraction, or percentage).<br>3. Followed by the Prerequisite IDs |

The administrator's interactions include a login 701 to the processor 12, which typically includes an entry of a password. The administrator is permitted by the system to access the user management subsystem 702 and a user database 703 thereby.

The administrator is responsible for automatically loading the desired skilling object metadata elements into the skilling object metadata database 200, via a routine 704 adapted therefor. The administrator is also responsible for automatically loading training intervention metadata elements into the training intervention metadata database 207 via a routine 706 adapted therefor. Help files 707 are also provided for guiding the administrator through the system. For courses that do not contain assessment features therewith, the administrator can use an assessment architect 708 to create them.

The administrator uses the matching routine 503 to match training interventions in the training intervention metadata database 207 to skilling objects in the skilling object metadata database 200. The matching routine 503 creates a Match Table 504 that contains scores for each match; the higher the score, the higher the probability of a valid association. Help files 709 are also provided here. The linking software 711 establishes a link and competency table (actually a subset of the training intervention metadata database) that reflects the valid association of skilling objects to training interventions. These associations and corresponding competency levels are used during the gap analysis process 202–207.

The user/employee accesses the system 10 and initiates the gap analysis process 202–207, as described earlier. The gap analysis software establishes an individual development plan 208 for the incoming skill gap. The system 10 exports the individual development plan 208 to an external learning management system 710, which the user accesses to take or register for the prescribed training interventions (courses).

Figure 6:
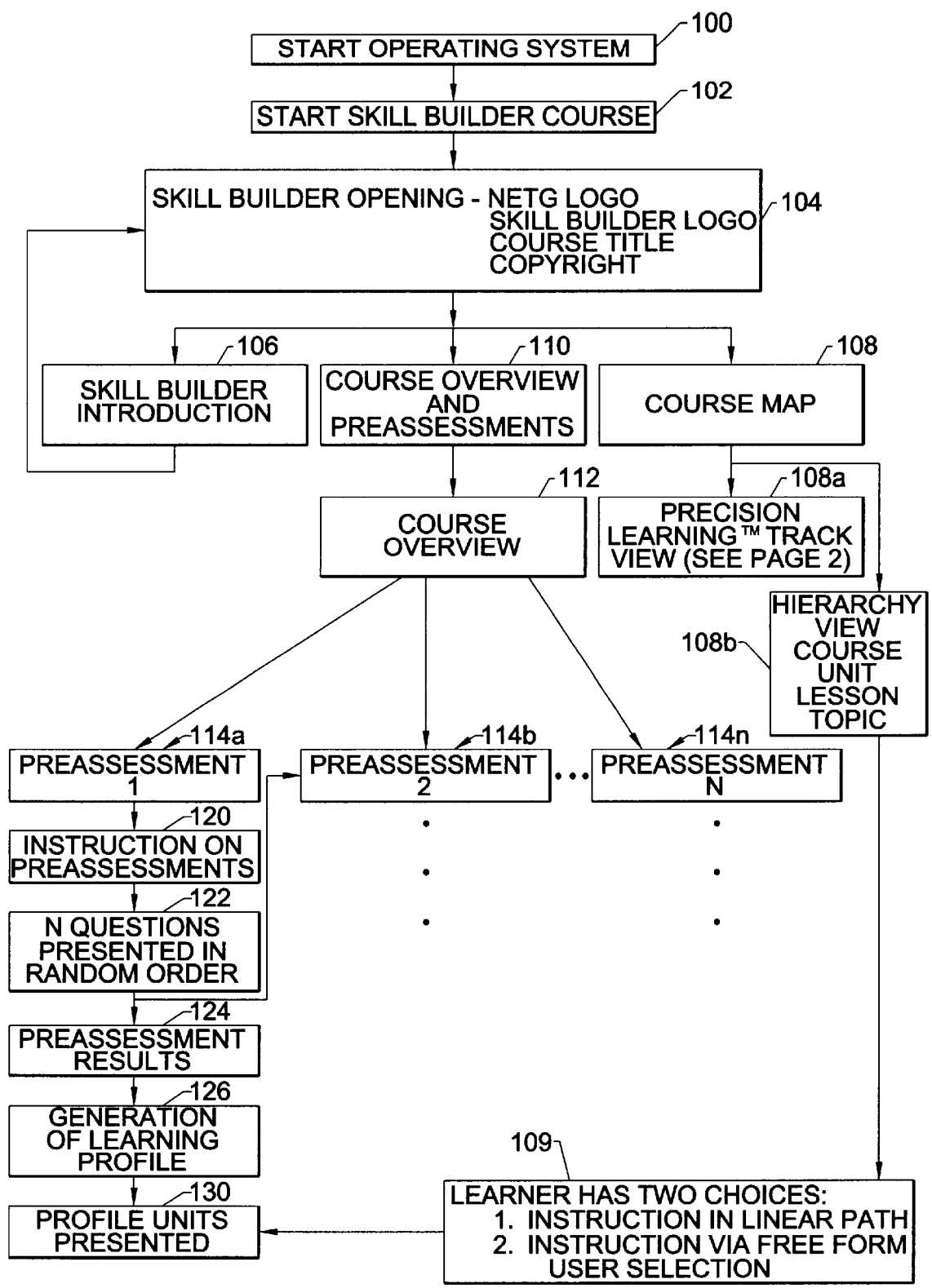
FIG. 6 is a block diagram of a learning system in accordance with the present invention.

FIG. 6 is a flow diagram illustrating various steps of a method in accordance with another aspect of the present invention, directed to a learner-directed curriculum experience. In a step 100, the operating system for the system 10 is started. In a step 102 execution of the interactive learning system application program of a type, for example, described in Lubin but for use with an icon-driven operating system such as available under Windows 95® is started. In a step 104 the learning system carries out an initial sequence of displaying titles and related text. When the system exits the initiating step 104, the user can select an introduction in a step 106 or can elect to turn directly to the course associated with the system in a step 108, or in a step 110, a user can enter a course overview and preassessment testing sequence. After passing through a course overview in a step 112, the user enters the beginning of a plurality of preassessment sequences indicated generally at 114a, 114b, . . . , 114n. The steps of a selected preassessment sequence are similar so a description of the sequence 114a will also describe sequences 114b, . . . 114n.

If the user wishes to skip the preassessment by proceeding directly to step 108, the Precision Learning Track view is displayed in step 108 a or a hierarchical view of the course unit lesson topics is presented in step 108b, which leads to a study of profile units.

In a step 120, instructions are presented on the display 20 for the user as to how to carry out the preassessment process. Subsequently, in a step 122 a plurality of questions or exercises are displayed, one at a time, in random order on the display 20. The user responds to each of the questions or exercises using the keyboard or mouse 28 and the responses are stored by the processor 12. In a step 124, the responses are compared to a pre-established standard, also stored in the disk drive 24 or the CD-ROM drive 26 to assess the performance of the user. For example and without limitation, if questions are presented to the user, they can be ranged so as to have right or wrong answers or to have more preferred versus less preferred answers, which can be in turn reflected in the prestored standard. The correlation between the answers received from the user during the step 122 and the appropriate or desirable answers as reflected in the prestored standard provides a basis for establishing a quantitative assessment of user performance (step 129). Subsequent to the step 124, if an individualized learning profile is to be produced based on the sequence 114a, that profile is then produced in a step 126. Subsequent to the step 126, the learning units can be presented to the user in a step 130 to be discussed subsequently.

If desired, prior to generation of the individualized learning profile in the step 126, additional preassessment sequences 114b, . . . , 114n can be executed to provide a composite learning profile.

Figure 7:
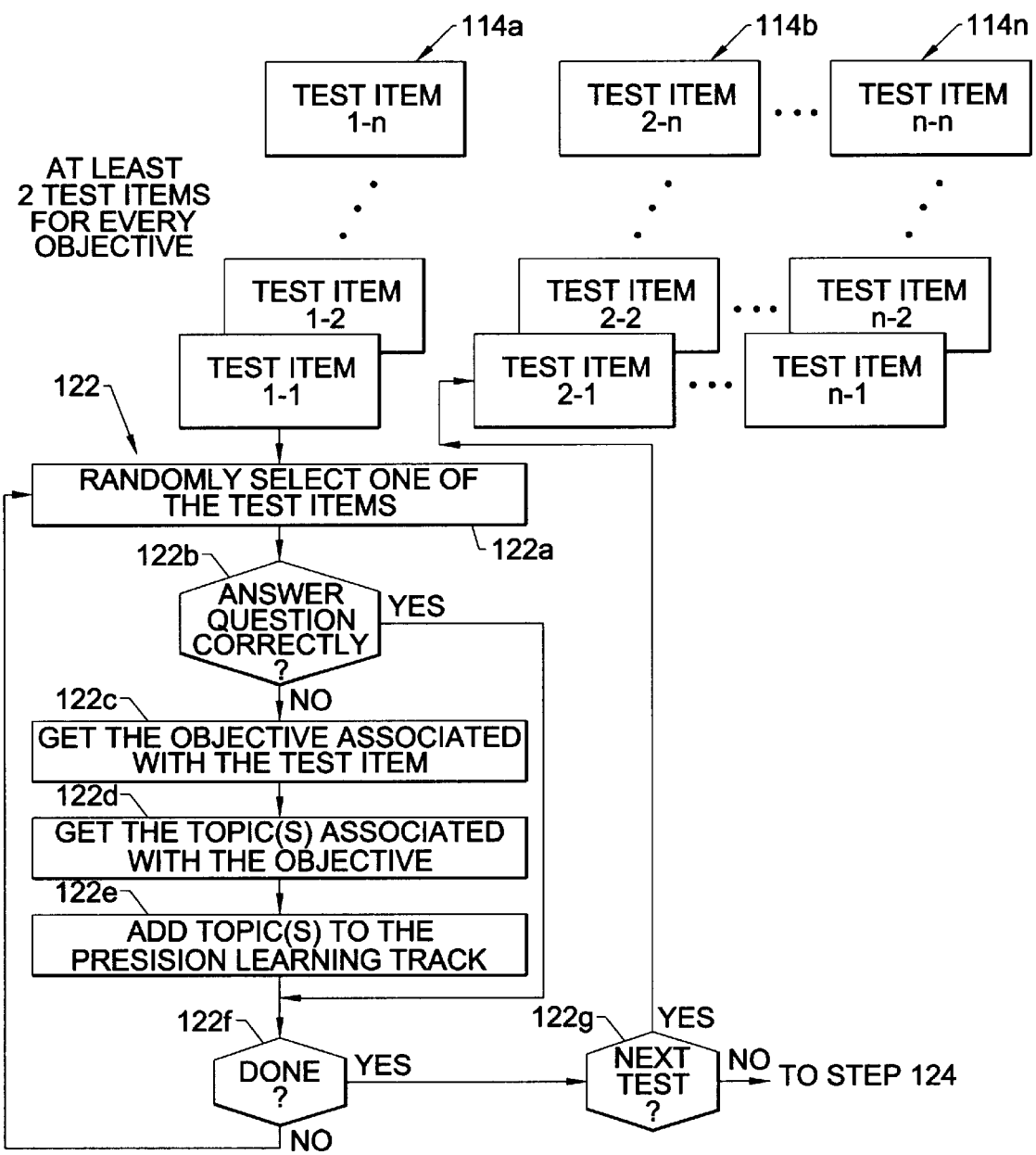
FIG. 7 is an overall flow diagram of the process of creating an individual learning profile.

FIG. 7 illustrates in more detail the generation of the individualized learning track as embodied in step 122. Test items 1-1 . . . 1-n to be presented in the step 122 are prestored in one of the disk drive 24 or CD-ROM drive 26. In step 122a, one of the test questions or exercises is selected and presented to the user on the display 20. The answer or response received via the input device 28 is compared to a previously stored answer and a step 122b. If the answer is unsatisfactory, the objective associated with the test item and the associated topic are retrieved in respective steps 122c, 122d. At least the associated topic is then added to the individual learning profile in a step 122e. If the test item is answered correctly in the step 122b, a determination is made in the step 122f if the testing sequence is finished. If it is not finished, the next test item is randomly selected at step 122a. If the test sequence is finished, either (step 122g) the next text sequence 114b is entered or the user's performance is assessed by proceeding to step 124 (FIG. 6).

Examples of test items follow as Examples 1 and 2. Example 1 illustrates two different matching-type test items. Example 2 illustrates two different process educating test items.

Figure 8:
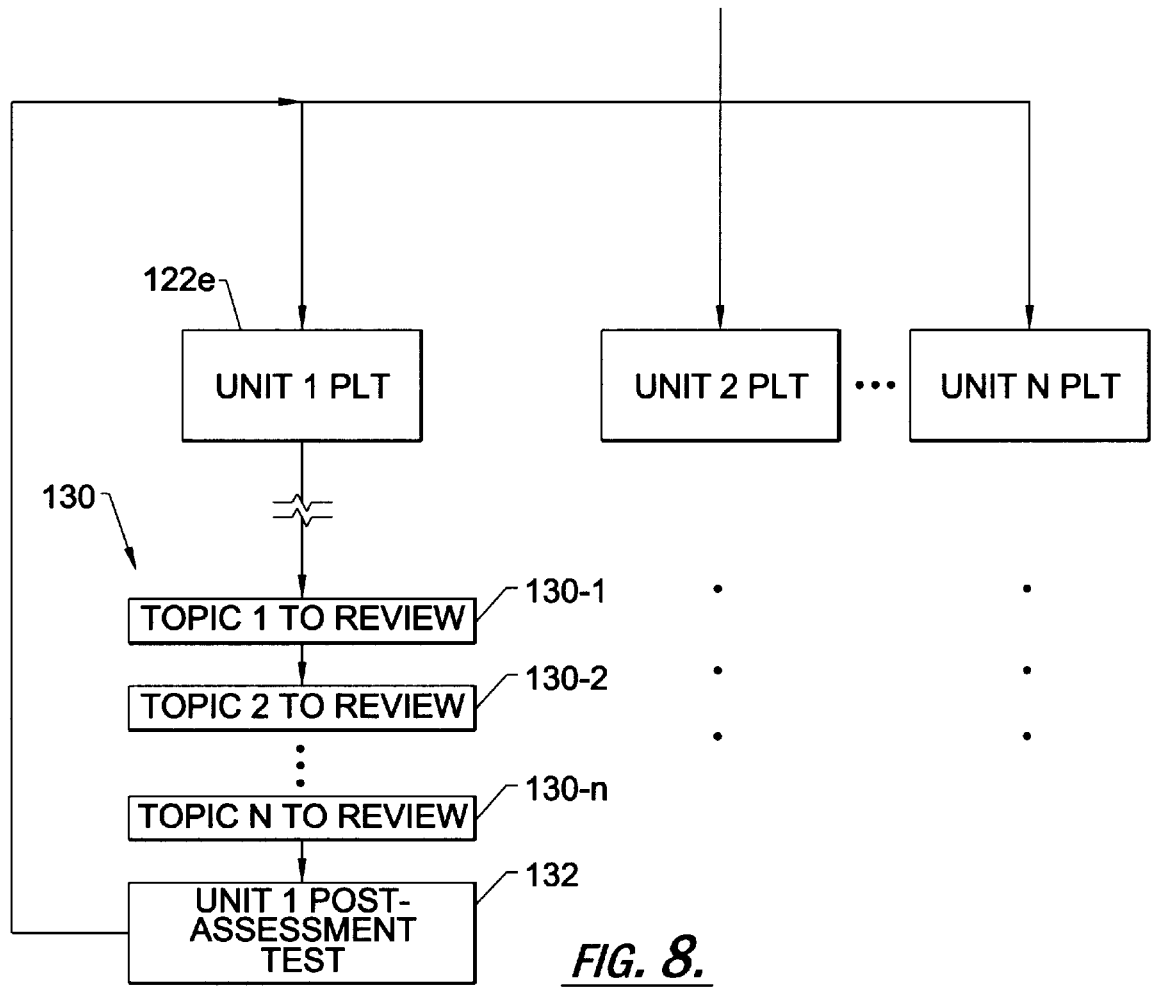
FIG. 8 is a more detailed flow diagram of one aspect of the process of FIG. 7.

FIG. 8 is a flow diagram illustrating in more detail substeps comprising an execution of the personal learning sequence, step 130. Where the personal learning sequence created in steps 122c–122e includes a plurality of topics $T_1 \ldots T_N$, the system 10 presents each of the selected topics in a series of steps 130-1, . . . , 130-n to the user via the display 20. The user can interact with the various presented topics via the keyboard or pointing device (e.g., mouse) 28 during the process of going through that particular individualized learning sequence. Subsequent to exiting the learning sequence, the system 10 can present a postassessment test in a step 132 to determine the level of skill that the user has attained as a result of the process. A similar set of steps can be carried out to implement the personal learning sequence for any or all of the units $U_2 \ldots U_N$ (steps $122e_2 \ldots 122e_N$).

Hence, when completed, the user will have experienced an individualized learning sequence in connection with one or more of the units 1–N. The user can then exit to the step 109 and enter the application or other program being taught for direct execution or can enter additional course units for further instruction.

FIG. 9 illustrates an overall flow diagram for an alternate approach to creating a personalized learning experience based on collecting together a plurality of separately accessible learning objects. The learning objects are contained in an accessible database that is organized in several different ways, having both hierarchical and contact-sensitive aspects.

A course object is made up of a plurality of independently accessible unit objects. Unit objects are learning objects that include a plurality of independent lesson objects. Lesson objects, in turn, are also learning objects that are made up of a plurality of dependent topic objects. Topic objects are dependent objects that contain a single objective and an assessment.

The content of a learning object is illustrated, in an overall sense, in block 150 of FIG. 9. A particular feature of the invention comprises the construction of the database, including a selection of an appropriate way to teach to the selected objective, that is, the learning activity. An exemplary selection is guided by an analysis of the cognitive complexity of the end goal of the objective. Once this analysis is made, an appropriate assessment mode is chosen from tasks such as multiple choice, multiple multiple choice, simulation, sequencing, and matching.

A particular model that may be employed comprises Bloom's Taxonomy, a continuum of cognitive complexity that allows the database developer to determine the learning activity. Bloom levels as known in the art comprise knowledge, comprehension, application, analysis, synthesis, and evaluation. Examination of a verb associated with the learning objective leads one to an appropriate Bloom level, and thus to an assessment mode. For example, if the learning objective is to be able to apply a formatting function within a word processing program, a multiple choice assessment question would not be appropriate; rather, a simulation of a formatting task would be preferable.

The lesson object is the smallest independent instructional activity available to a user. A given lesson object exhibits internal cohesion and is focused about a plurality of dependent topic objects.

A lesson object comprises three elements, incorporating a plurality of objectives as well as a second plurality of test or assessment items. It also incorporates predefined sequencing and interactions between related, dependent, topic objects. The learning activity teaches to the associated earning objective.

Lesson objects can be linked with other lesson objects or can stand alone. Topic objects, by way of contrast, are dependent on the associated lesson object and contain only a single objective and an associated assessment.

As illustrated in block 152 of FIG. 9, learning objects can be implemented out of a plurality of linked pages. The pages can be linked together both linearly and nonlinearly. Pages can contain text, multimedia components, and user interaction logic.

Alternately, learning objects can be grouped together as a result of content or because one or more serves as a prerequisite for another, as illustrated in element 154 of FIG. 9.

A plurality of learning objects can be selected by a user 90 through an object access program 156. The user 90 can select, via the access program 156, one or more lesson objects to be experienced for the purpose of addressing an education or training objective. Learning objects can be stored on a variety of media such as magnetic discs and/or CD ROMs. The object access program 156 can be accessed by the user 90 not only directly through a local area network but also remotely via, for example, the Internet and the World Wide Web, if desired.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computer-based method of automatically determining and providing a recommendation for an individualized learning sequence to a user comprising the steps of:

identifying a skill desired to be possessed of a user;

accessing a first electronic database comprising data representative of a set of skills currently possessed by the user;

electronically comparing the desired skill with the possessed set of skills;

if the possessed set of skills does not comprise the desired skill, automatically mapping the desired skill with data on at least one training intervention resident in a second electronic database, wherein the mapping step comprises creating a match table of training interventions to skills, each match having associated therewith a probability of a valid relationship therebetween; and automatically presenting the user with a recommendation for a training regimen comprising the at least one training intervention.

2. The method recited in claim 1, further comprising the steps of:

identifying a skill level of the desired skill;

accessing the first electronic database, which further comprises data representative of a skill level for each of the skills in the set;

electronically comparing the desired skill level with the possessed skill level;

if the possessed skill level is not at least as great as the desired skill level, automatically mapping the desired skill level with data on at least one training intervention resident in the second electronic database; and automatically resenting the user with the training regimen.

3. The method recited in claim 1, wherein the data in the second electronic database comprise metadata elements comprising linkage information between skills and training interventions.

4. The method recited in claim 1, wherein a higher probability is assigned to a match comprising a plurality of common words therebetween.

5. The method recited in claim 4, wherein the mapping is created if the probability exceeds a predetermined level.

6. The method recited in claim 1, wherein the presenting step comprises displaying the training regimen to the user on a screen.

7. The method recited in claim 1, wherein the training regimen comprises at least one of a computer-based learning experience or a plan for direct functional training in the desired skill.

8. The method recited in claim 1, wherein the presenting step comprises presenting the user with an option to obtain information on the training regimen, including data selected from a description thereof, a set of instructions therefor, a duration thereof, and an objective thereof.

9. A computer-based method of automatically determining and providing an individualized learning sequence to a user comprising the steps of:

identifying a skill desired to be possessed of a user;

accessing a first electronic database comprising means for preassessing a current level of skill currently possessed by the user;

comparing the desired skill with a result of the preassessment step;

if the preassessment result indicates that the user does not possess the desired skill to a predetermined level, mapping the desired skill with a training regimen resident in a second electronic database, wherein the mapping step comprises creating a match table of training interventions to skills, each match having associated therewith a probability of a valid relationship therebetween; and automatically presenting the user with the training regimen.

10. A method for developing a customizable learning system comprising the steps of:

constructing a first electronic table comprising a plurality of skills;

constructing a second electronic table comprising a list of training regimen identifiers;

mapping each skill to at least one training regimen identifier, including creating a match table of training interventions to skills, each match having associated therewith a probability of a valid relationship therebetween;

constructing a first database adapted to contain a list of users and a set of skills possessed by each user;

constructing a second database adapted to contain a training regimen associated with each training regimen identifier;

creating a user interface adapted to receive a selection of a skill desired to be learned by a user, the skill an element of the first table;

creating a means for accessing from the second database a training regimen that corresponds to the skill/training regimen identifier mapping; and creating a means for presenting the user with the accessed training regimen.

11. The method recited in claim 10, wherein the first database is further adapted to contain a skill level attained for each skill and for each user.

12. The method recited in claim 10, wherein the user interface comprises a display screen containing a list of selectable skills.

13. The method recited in claim 10, further comprising the steps of constructing a manager interface adapted to receive a new skill for the first table from a system manager and mapping the new skill to at least one training regimen identifier.

14. A method for developing a customizable learning system comprising the steps of:

constructing a first electronic table comprising a plurality of skills;

constructing a second electronic table comprising a list of training regimen identifiers;

mapping each skill to at least one training regimen identifier;

constructing a first database adapted to contain a list of users and a set of skills possessed by each user;

constructing a second database adapted to contain a training regimen associated with each training regimen identifier;

creating a user interface adapted to receive a selection of a skill desired to be learned by a user, the skill an element of the first table;

creating a means for accessing from the second database a training regimen that corresponds to the skill/training regimen identifier mapping;

creating a means for presenting the user with the accessed training regimen, a skill level range for the new skill;

constructing a manager interface adapted to receive a new skill and a skill level range for the new skill for the first table from a system manager; and mapping the new skill to at least one training regimen identifier.

15. The method recited in claim 14, wherein the manager interface is further adapted to receive a prerequisite skill level for the new skill.

16. The method recited in claim 14, further comprising the steps of entering a new training regimen into the second database and constructing a second manager interface adapted to receive a new training regimen identifier for the second table from the system manager and for linking the new identifier with the new training regimen.

17. A system for automatically determining and providing an individualized learning sequence to a user comprising:

a processor;

input means and output means, each in electronic communication with the processor;

storage means accessible by the processor having resident thereon a first electronic database comprising a set of skills currently possessed by a user;

means resident in the processor for comparing a skill desired to be possessed by the user with the possessed set of skills;

means resident in the processor for mapping the desired skill with a training regimen resident in a second electronic database if the possessed set of skills does not comprise the desired skill, the mapping means comprising means for creating a match table of training interventions to skills, each match having associated therewith a probability of valid relationship therebetween; and means resident in the processor for automatically presenting via the output means the training regimen to the user.

* * * * *